United States Patent
Yang et al.

(10) Patent No.: US 9,836,335 B2
(45) Date of Patent: Dec. 5, 2017

(54) BEHAVIOR-BASED DISTRACTING APPLICATION DETECTION ON VEHICLES

(71) Applicant: QUALCOMM Incorporated, San Diego, CA (US)

(72) Inventors: Yafei Yang, Escondido, CA (US); Liang Cai, San Diego, CA (US); Xu Guo, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 0 days.

(21) Appl. No.: 14/873,518

(22) Filed: Oct. 2, 2015

(65) Prior Publication Data
US 2017/0097857 A1    Apr. 6, 2017

(51) Int. Cl.
| | |
|---|---|
| *G06F 9/54* | (2006.01) |
| *G06F 11/34* | (2006.01) |
| *G06F 11/30* | (2006.01) |
| *G06F 3/0488* | (2013.01) |
| *H04W 4/00* | (2009.01) |

(52) U.S. Cl.
CPC ............ *G06F 9/542* (2013.01); *G06F 3/0488* (2013.01); *G06F 11/3024* (2013.01); *G06F 11/3409* (2013.01); *H04W 4/008* (2013.01)

(58) Field of Classification Search
None
See application file for complete search history.

(56) References Cited

U.S. PATENT DOCUMENTS

| | | | |
|---|---|---|---|
| 8,527,013 B2 | 9/2013 | Guba et al. | |
| 8,744,678 B2 | 6/2014 | Smith et al. | |
| 8,914,012 B2 | 12/2014 | Crosbie et al. | |
| 2011/0185390 A1* | 7/2011 | Faenger | H04M 1/6075 725/75 |
| 2012/0041633 A1 | 2/2012 | Schunder et al. | |
| 2012/0176232 A1* | 7/2012 | Bantz | G07C 5/008 340/439 |
| 2013/0038437 A1* | 2/2013 | Talati | B60K 35/00 340/438 |
| 2013/0150004 A1 | 6/2013 | Rosen | |
| 2013/0297097 A1* | 11/2013 | Fischer | G06F 17/00 701/1 |

(Continued)

FOREIGN PATENT DOCUMENTS

WO    2010129939 A1    11/2010

OTHER PUBLICATIONS

International Search Report and Written Opinion—PCT/US2016/045265—ISA/EPO—dated Nov. 4, 2016—10 pgs.

*Primary Examiner* — Tuan Dao
(74) *Attorney, Agent, or Firm* — Hunter Clark PLLC

(57) ABSTRACT

Techniques for operating a computer system for a vehicle are provided. An example method according to these techniques includes observing usage of at least one component of the computer system by an application to generate an application usage log for the application, deriving behavior vectors from the application usage log, determining whether the application is a distracting application by comparing the behavior vectors to one or more application safety rules, and limiting execution of the application responsive to determining that the application is a distracting application and based on status information associated with the vehicle.

28 Claims, 9 Drawing Sheets

(56) References Cited

U.S. PATENT DOCUMENTS

2014/0106726 A1* 4/2014 Crosbie ................ H04W 4/046
  455/418
2014/0335902 A1* 11/2014 Guba .................... H04W 4/027
  455/456.4
2015/0019266 A1* 1/2015 Stempora ............... G06Q 40/08
  705/4
2015/0062017 A1 3/2015 Barabas et al.

* cited by examiner

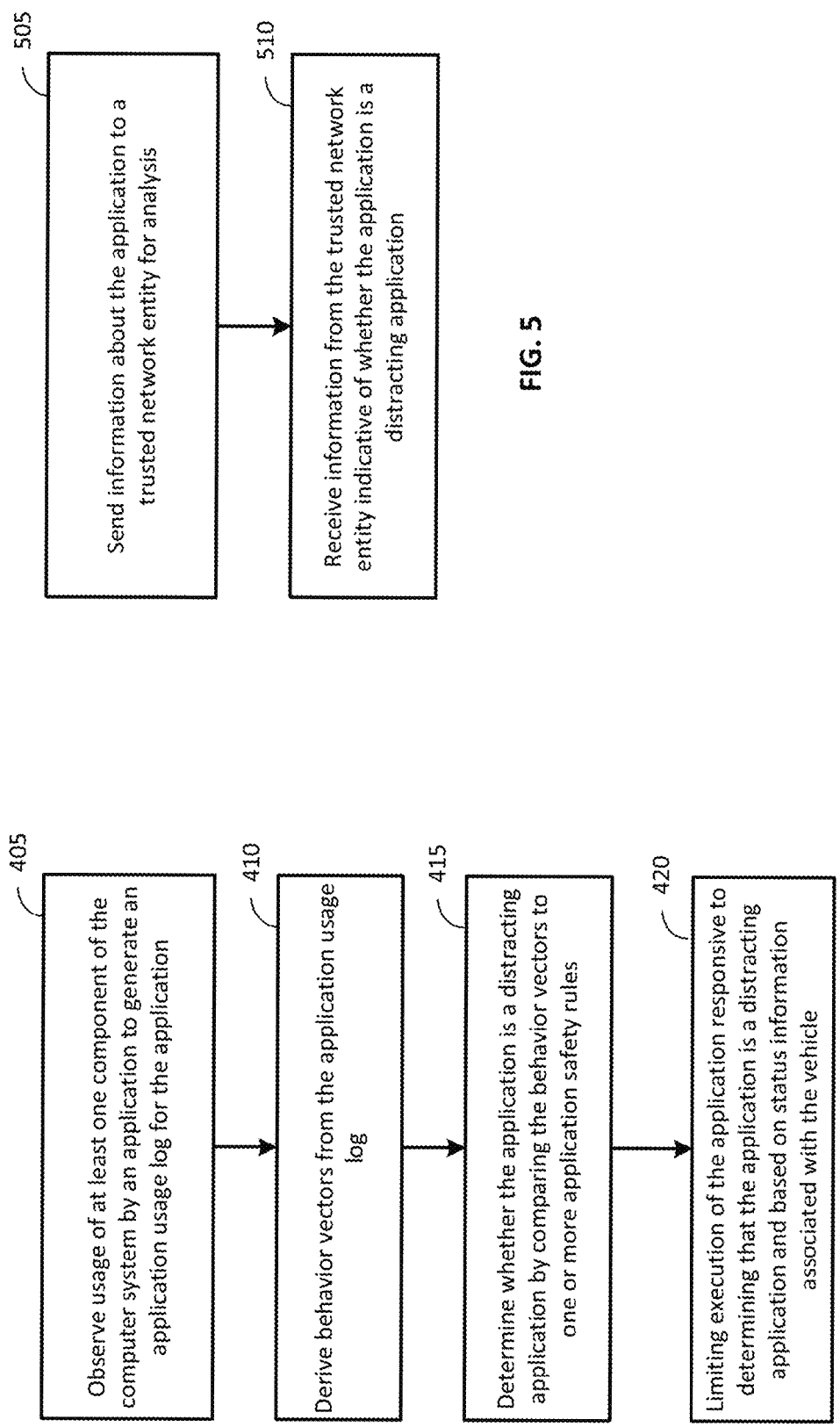

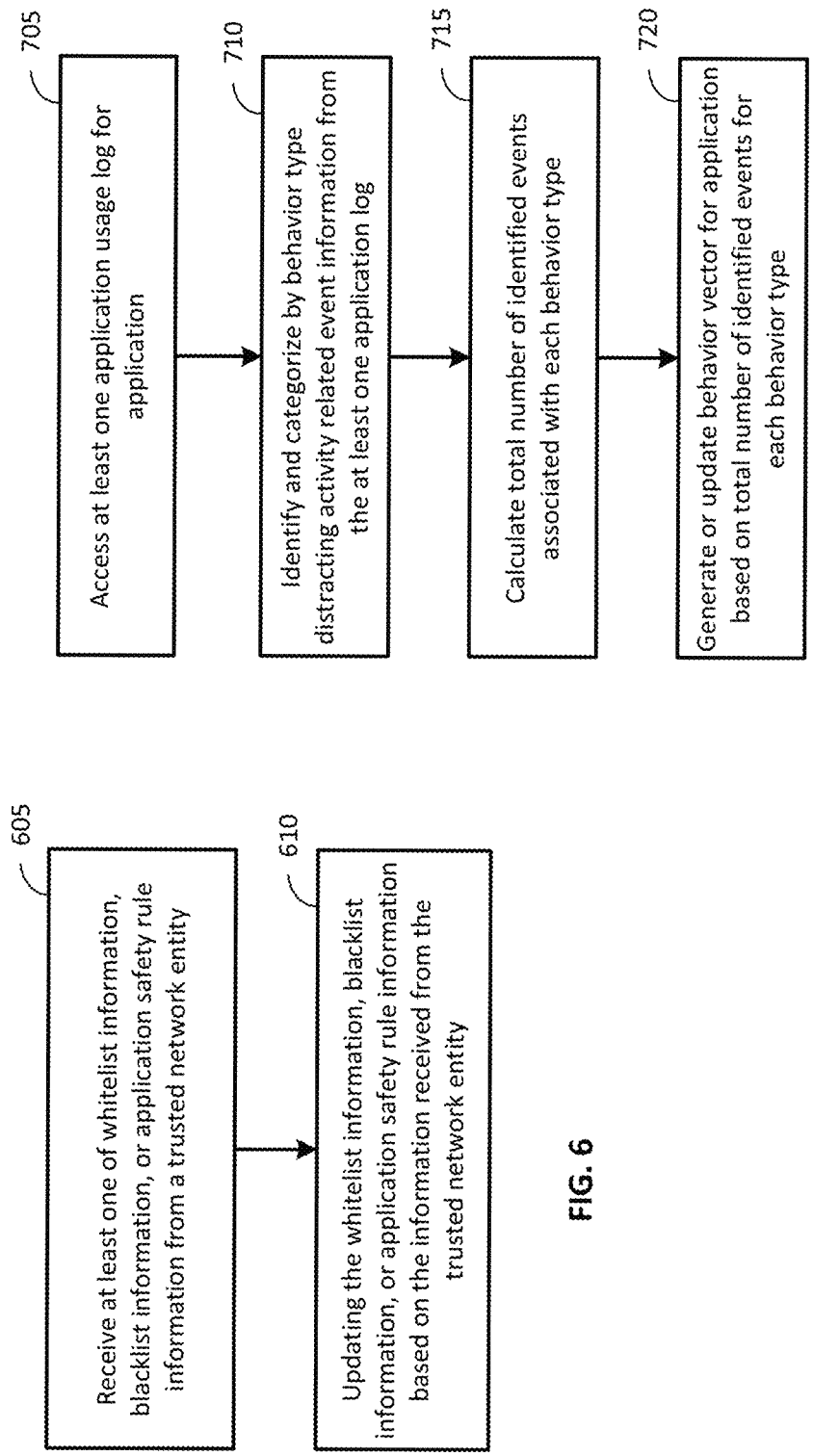

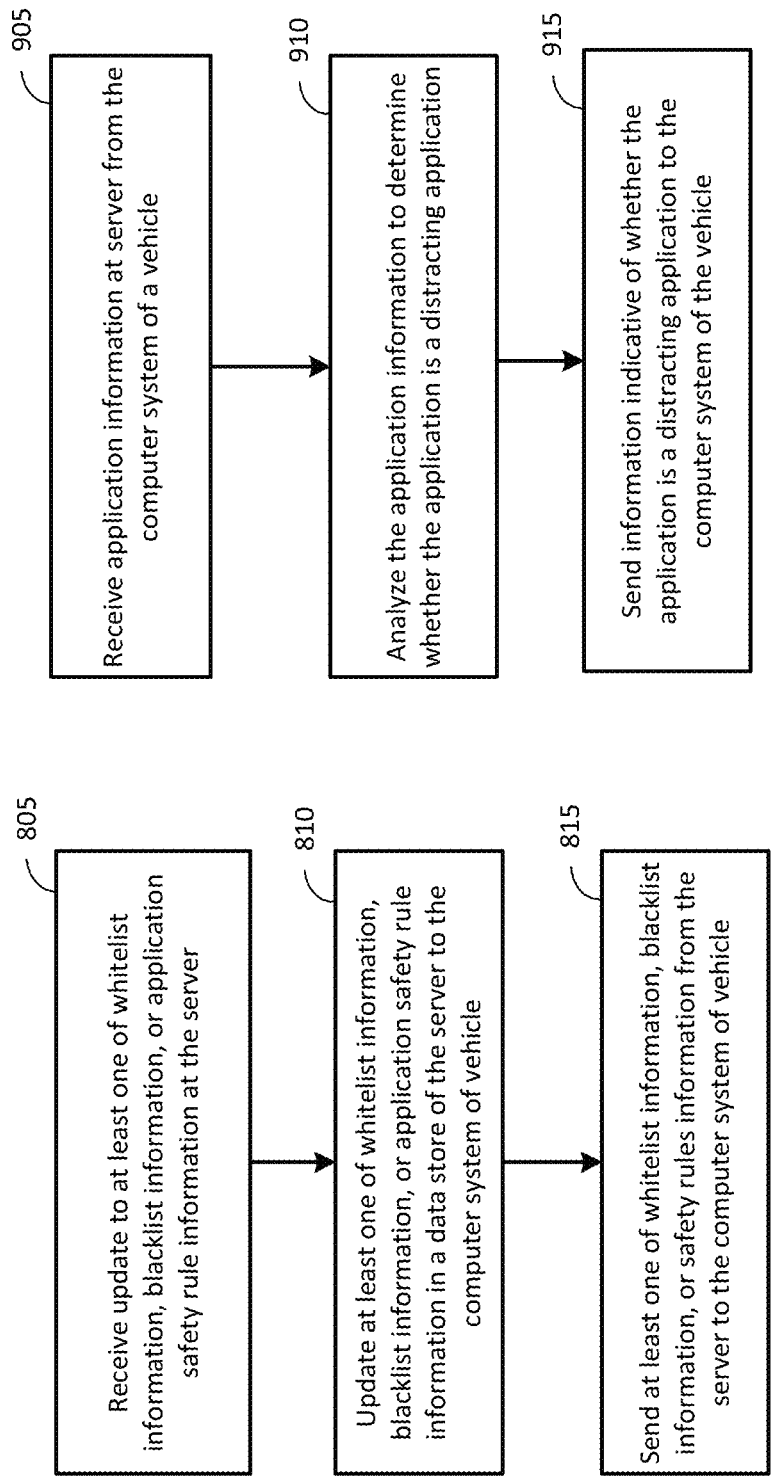

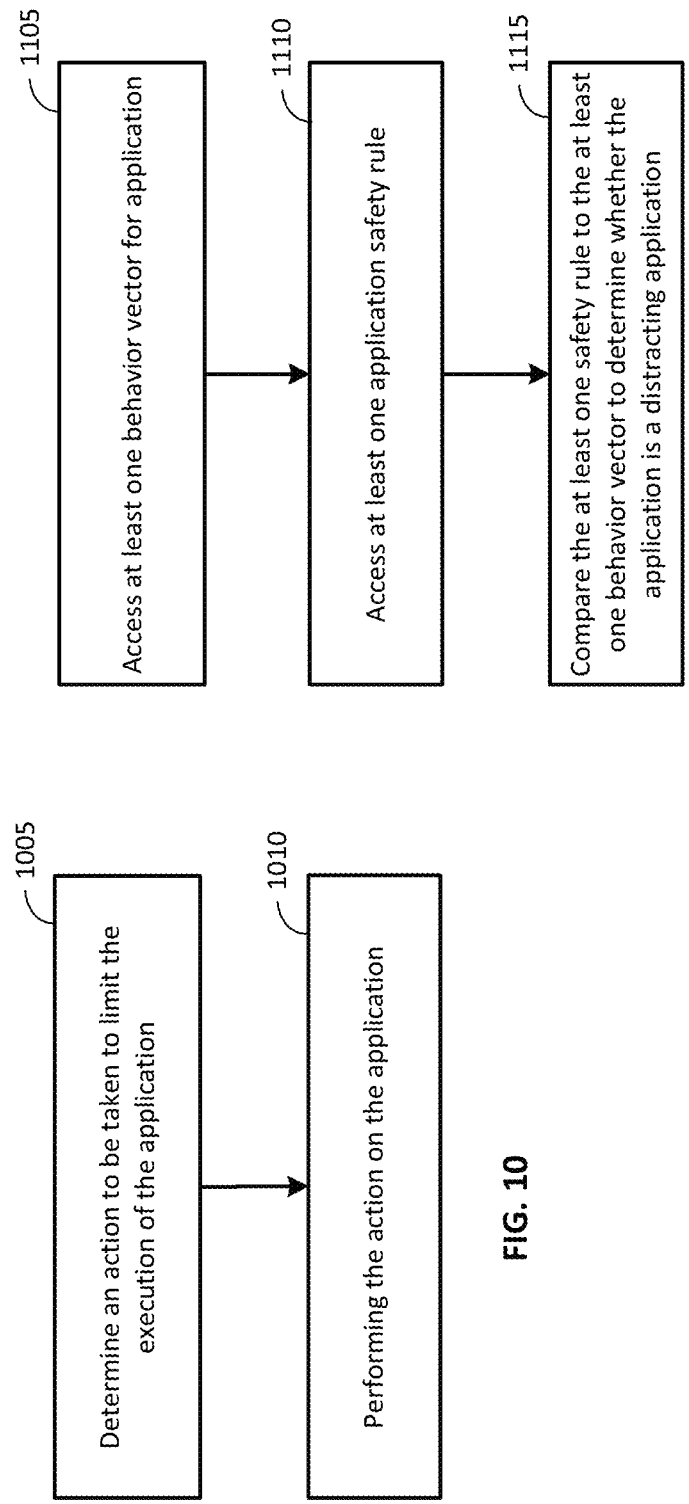

BEHAVIOR-BASED DISTRACTING APPLICATION DETECTION ON VEHICLES

BACKGROUND

Many vehicles include now include a network-connected computer system that can provide information and entertainment content and may provide control over one or more aspects of the vehicle. The computer system can include a touchscreen interface based on a High Level Operating System (HLOS), such as the Android operating system, the QNX operating system, or other such HLOS that can be used in a computer system of a vehicle. The computer system can include one or more modems that provide wireless network connectivity utilizing Long Term Evolution (LTE), WiFi, dedicated short-range communications (DSRC), and/or other wireless communication protocols. As these in-vehicle computer systems become more ubiquitous components of vehicles, the dangers presented by these computer systems also increase. Currently, auto makers are deeply involved in the development of applications for these in vehicle computer systems and can control the types of applications that are installed on these devices. However, car makers will not be able to prevent users from downloading and executing applications that have not be vetted as being safe and non-distracting for use on an in vehicle computer system. Auto makers and regulators will require means for identifying distracting applications and for limiting their execution on such in vehicle computer system.

SUMMARY

An example method according to the disclosure includes observing usage of at least one component of the computer system by an application to generate an application usage log for the application, deriving behavior vectors from the application usage log, determining whether the application is a distracting application by comparing the behavior vectors to one or more application safety rules, and limiting execution of the application responsive to determining that the application is a distracting application and based on status information associated with the vehicle.

Implementations of such a method can include one or more of the following features. Deriving the behavior vectors from the application usage log includes calculating a behavior value for each of a plurality of behavior parameters associated with usage of the computer system. The plurality of behavior parameters includes a frequency at which a user touches a touchscreen of the computer system while interacting with the application. The plurality of behavior parameters includes a frequency at which a display of the computer system changes by more than a threshold amount over a predetermined period of time. The plurality of behavior parameters includes a frequency at which a display of the computer system changes by more than a threshold amount over a predetermined period of time. The plurality of behavior parameters includes a frequency at which information is presented. The status information associated with the vehicle is indicative of a speed of the vehicle, and limiting the execution of the application responsive to determining that the application is a distracting application and based on the status information associated with the vehicle includes limiting the execution of the application responsive to the status information associated with the vehicle indicating that the vehicle is moving faster than a threshold speed. Receiving updates to the one or more application safety rules via a wireless connection of the computer system. Determining whether the application is a distracting application by comparing the behavior vectors to the one or more application safety rules includes sending information about the application to a trusted network entity for analysis, and receiving information from the trusted network entity indicative of whether the application is a distracting application.

An example computer system for a vehicle according to the disclosure includes means for observing usage of at least one component of the computer system by an application to generate an application usage log for the application, means for deriving behavior vectors from the application usage log, means for determining whether the application is a distracting application by comparing the behavior vectors to one or more application safety rules, and means for limiting execution of the application responsive to determining that the application is a distracting application and based on status information associated with the vehicle.

Implementations of such a computer system can include one or more of the following features. The means for deriving the behavior vectors from the application usage log comprise means for calculating a behavior value for each of a plurality of behavior parameters associated with usage of the computer system. The plurality of behavior parameters comprises a frequency at which a user touches a touchscreen of the computer system while interacting with the application. The plurality of behavior parameters comprises a frequency at which a display of the computer system changes by more than a threshold amount over a predetermined period of time. The plurality of behavior parameters comprises a frequency at which a display of the computer system changes by more than a threshold amount over a predetermined period of time. The plurality of behavior parameters comprises a frequency at which information is presented. The status information associated with the vehicle is indicative of a speed of the vehicle, and wherein the means for limiting the execution of the application responsive to determining that the application is a distracting application and based on the status information associated with the vehicle comprises limiting the execution of the application responsive to the status information associated with the vehicle indicating that the vehicle is moving faster than a threshold speed. Receiving updates to the one or more application safety rules via a wireless connection of the computer system. Determining whether the application is a distracting application by comparing the behavior vectors to the one or more application safety rules further comprises sending information about the application to a trusted network entity for analysis, and receiving information from the trusted network entity indicative of whether the application is a distracting application.

An example computer system for a vehicle according to the disclosure includes a memory, and at least one processor coupled to the memory. The at least one processor is configured to observe usage of at least one component of the computer system by an application to generate an application usage log for the application, derive behavior vectors from the application usage log, determine whether the application is a distracting application by comparing the behavior vectors to one or more application safety rules, and limit execution of the application responsive to determining that the application is a distracting application and based on status information associated with the vehicle.

Implementations of such a computer system can include one or more of the following features. The at least one processor being configured to derive the behavior vectors from the application usage log is configured to calculate a behavior value for each of a plurality of behavior parameters associated with usage of the computer system. The plurality of behavior parameters includes at least one of a frequency at which a user touches a touchscreen of the computer system while interacting with the application, a frequency at which a display of the computer system changes by more than a threshold amount over a first predetermined period of time, a frequency at which the display of the computer system changes by more than a threshold amount over a second predetermined period of time, and a frequency at which information is presented. The status information associated with the vehicle is indicative of a speed of the vehicle, and the at least one processor being configured to limit the execution of the application responsive to determining that the application is a distracting application and based on the status information associated with the vehicle is configured to limit the execution of the application responsive to the status information associated with the vehicle indicating that the vehicle is moving faster than a threshold speed. The at least one processor is further configured to receive updates to the one or more application safety rules via a wireless connection of the computer system. The at least one processor being configured to determine whether the application is a distracting application by comparing the behavior vectors to the one or more application safety rules is further configured to send information about the application to a trusted network entity for analysis, and receive information from the trusted network entity indicative of whether the application is a distracting application.

An example non-transitory, computer-readable medium according to the disclosure has instructions stored therein for operating a computer system for a vehicle. The instructions include instructions configured to cause the computer system to observe usage of at least one component of the computer system by an application to generate an application usage log for the application, derive behavior vectors from the application usage log, determine whether the application is a distracting application by comparing the behavior vectors to one or more application safety rules, and limit execution of the application responsive to determining that the application is a distracting application and based on status information associated with the vehicle.

Implementations of such non-transitory, computer-readable medium can include one or more of the following features. The instructions configured to cause the computer system to derive the behavior vectors from the application usage log include instructions configured to cause the computer system to calculate a behavior value for each of a plurality of behavior parameters associated with usage of the computer system. The plurality of behavior parameters includes at least one of a frequency at which a user touches a touchscreen of the computer system while interacting with the application, a frequency at which a display of the computer system changes by more than a threshold amount over a first predetermined period of time, a frequency at which the display of the computer system changes by more than a threshold amount over a second predetermined period of time, and a frequency at which information is presented. The status information associated with the vehicle is indicative of a speed of the vehicle, and the instructions configured to cause the computer system to limit the execution of the application responsive to determining that the application is a distracting application and based on the status information associated with the vehicle include instructions configured to cause the computer system to limit the execution of the application responsive to the status information associated with the vehicle indicating that the vehicle is moving faster than a threshold speed. Instructions configured to cause the computer system to receive updates to the one or more application safety rules via a wireless connection of the computer system. The instructions configured to cause the computer system to determine whether the application is a distracting application by comparing the behavior vectors to the one or more application safety rules include instructions configured to cause the computer system to send information about the application to a trusted network entity for analysis, and receive information from the trusted network entity indicative of whether the application is a distracting application.

BRIEF DESCRIPTION OF THE DRAWINGS

FIG. 4 is a flow diagram of an example process for operating a computer system for a vehicle according to the techniques discussed herein.

FIG. 5 is a flow diagram of an example process for sending a application information to a server for an assessment of whether an application is a distracting application according to the techniques discussed herein.

FIG. 6 is a flow diagram of an example process for receiving application information from a server according to the techniques discussed herein.

FIG. 7 is a flow diagram of an example process for deriving behavior vectors from an application usage log according to the techniques discussed herein.

FIG. 8 is a flow diagram of an example process for receiving at a server an update to application-related information and for providing the application-related information to the computer system of a vehicle according to the techniques discussed herein.

FIG. 9 is a flow diagram of an example process for analyzing application information at a server to determine whether the application is a distracting application according to the techniques discussed herein.

FIG. 10 is a flow diagram of an example process for determining an action to be taken to limit the execution of an application on the computer system according to the techniques discussed herein.

FIG. 11 is a flow diagram of an example process for determining whether the application is a distracting application by comparing the behavior vectors to one or more application safety rules according to the techniques discussed herein.

DETAILED DESCRIPTION

Techniques are disclosed that provide for identifying distracting applications and for limiting their execution on an in vehicle computer system. The techniques disclosed herein can be performed on the computer system in the vehicle, by a trusted entity network entity operated by a vehicle maker and/or regulators, or a combination thereof. The techniques can include observing usage of at least one component of a computer system for a vehicle by an application to generate an application usage log for the application, deriving behavior vectors from the application usage log, determining whether the application is a distracting application by comparing the behavior vectors to one or more application safety rules, and limiting execution of the application responsive to determining that the application is a distracting application and based on status information associated with the vehicle. The following description and the figures illustrate example implementations of these techniques.

Figure 1:
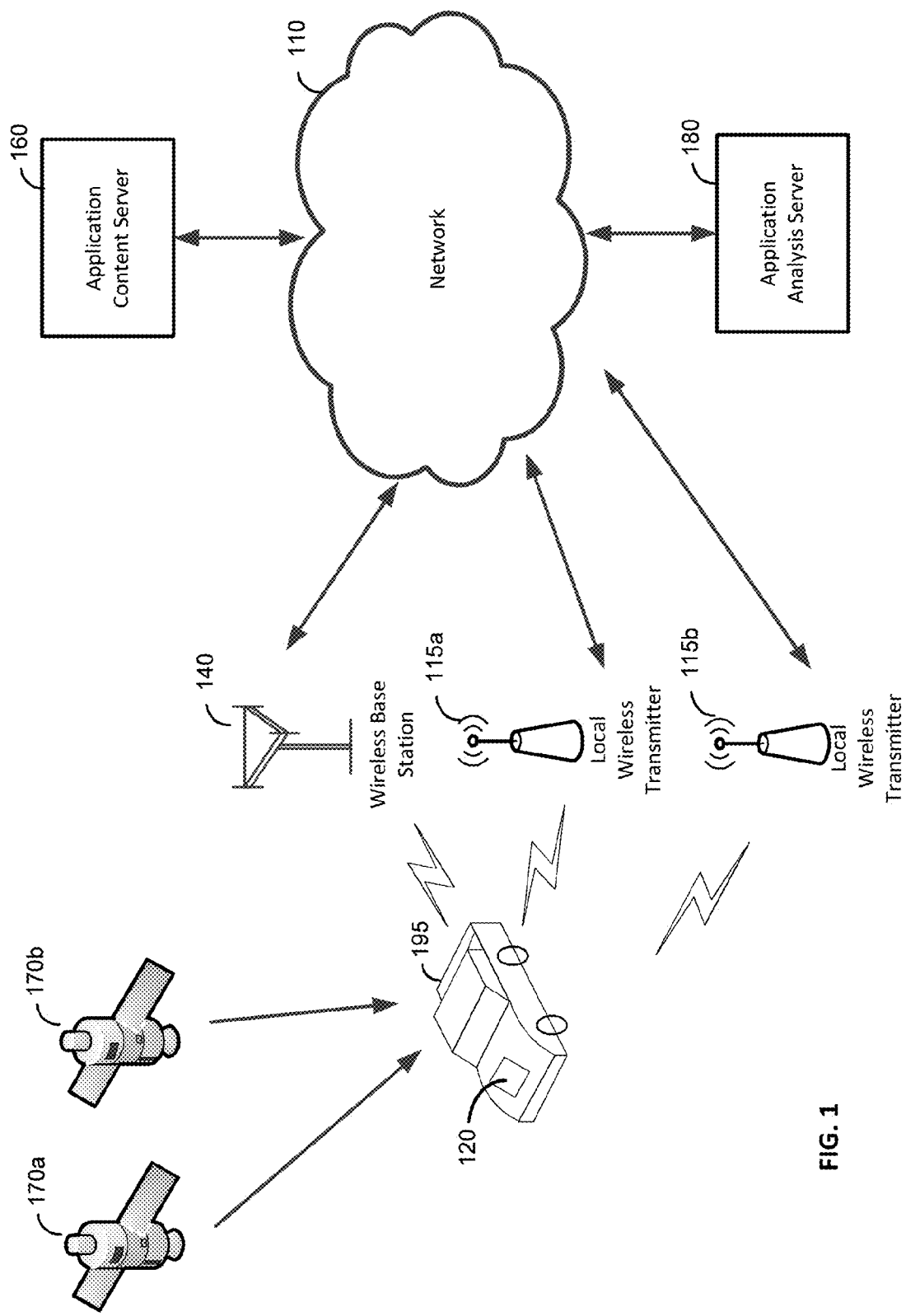
FIG. 1 is a block diagram of an example network architecture, which may be suitable for implementing the techniques discussed herein.

FIG. 1 is a block diagram of an example network architecture, which may be suitable for implementing the techniques discussed herein. The particular configuration illustrated herein is merely an example of one network configuration in which the techniques disclosed herein may be used. Furthermore, an implementation of such a network architecture may include additional elements that are not illustrated herein and have been omitted for the sake of clarity. The example network architecture provides an example of a network environment in which a computer system in which the techniques disclosed herein may be implemented can operate.

The computer system 120 can comprise a computer system installed in the dashboard or otherwise integrated into the control panel of a vehicle 195. The computer system 120 can be integrated into one or more vehicle computer systems. The computer system 120 can be configured to provide access to vehicle information, such as vehicle speed, outside/inside temperature, fuel efficiency, range information, etc., and to allow the user to control aspects of the vehicle, such as the climate control system of the vehicle, from the computer system 120. The computer system 120 can also be configured to provide navigation information, such a maps and navigation instructions to the user. The computer system 120 can also be configured to provide entertainment content, such as terrestrial and/or satellite radio content, and/or provide audiovisual content obtained from the network and/or from a local memory of the computer system 120. The computer system 120 can be configured to communicate using one or more wireless communications protocols, including, but not limited to, the Long Term Evolution (LTE), wireless local area network (WLAN), and WiMAX wireless communications protocols. The computer system 120 can also be configured to support other types of wireless communications protocols and can be configured to support multiple different wireless communications protocols. The wireless transmitter of the computer system 120 can be configured to send data to and/or receive data from other devices, the wireless transmitters 115, and/or one or more wireless base station, such as wireless base station 140.

The computer system 120 can also be configured to measure signals from one or more wireless base stations or wireless access points, such as the wireless transmitters 115 and the wireless base station 140, and obtain timing measurements (e.g., for time of arrival (TOA) or observed time difference of arrival (OTDOA)), signal strength measurements (e.g., Receive Signal Strength Indication (RSSI)), RTT (round-trip time) and/or signal quality measurements for the wireless base stations. The pseudo-range measurements, timing measurements, signal strength measurements, and/or signal quality measurements may be used to derive a location estimate for the computer system 120. A location estimate may also be referred to as a position estimate, a position fix, etc. Two terrestrial wireless transmitters are illustrated in this example: 115a and 115b. However, in other implementations, more or less wireless transmitters 115 may be included. The computer system 120 can also be configured to use a combination of signals from one or more of the satellites 170, the wireless base station 140, and/or the wireless transmitters 115 to determine a position of the computer system 120.

Each of the wireless transmitters 115 can comprise a WLAN wireless access point configured to operate using the IEEE 802.11 wireless communication standards. But, in some implementations some or all of the wireless transmitters 115 may be configured to utilize other wireless communications protocols, and some network environments may include more than one type of wireless transmitter. Furthermore, while the wireless transmitters 115 are identified as transmitters, the wireless transmitters 115 may be transceivers configured to send and/or receive data wirelessly. The wireless transmitters 115 can be connected to network 110 via a backhaul connection that provides a broadband connection to the network 110. The network 110 may be the Internet and/or a combination of one or more networks. For example, the wireless transmitter (such as one of the wireless transmitters 115) may be connected to a digital subscriber line (DSL) modem or a cable modem, depending upon the type of broadband service being used in that particular implementation. A wireless transmitter (such as one of the wireless transmitters 115) can be associated with a mobile communication network provider and can be configured to communicate with the mobile communication network provider's network (not shown) via the network 110. The coverage area of the a wireless transmitter (such as one of the wireless transmitters 115) may overlap with that of one or more macrocell base stations, such as wireless base station 140, or that of one or more other terrestrial transceivers.

The wireless base station 140 can be configured to provide wireless network connectivity to a plurality of mobile devices, such as computer system 120. The wireless base station 140 can comprise a macrocell base station, a femtocell base station, a picocell base station, or other type of base station. The wireless base station 140 may have a much larger coverage area than the wireless transmitter (such as one of the wireless transmitters 115) or may be a terrestrial transceiver that provides a coverage area that is of a similar size or of a smaller size than the coverage area provided by the wireless transmitters 115. Wireless base station 140 can be configured to communicate using one or more wireless communications protocols. While the example illustrated in FIG. 1 includes on a single wireless base station, in other implementations the network environment is likely to include more than wireless base station 140 which have coverage areas that may overlap at least in part.

The computer system 120 can be configured to include a Global Navigation Satellite System (GNSS) receiver configured to receive and measure signals from one or more satellites 170, such as satellite 170a and satellite 170b, and to obtain pseudo-range measurements for the satellites 170. Satellites 170 may be part of a Global Navigation Satellite System (GNSS), which may be the United States Global Positioning System (GPS), the European Galileo system, the Russian GLONASS system, or some other GNSS. The GNSS receiver may also be configured to detect and receive signals from satellites 170 belonging to more than one GNSS system. For example, satellite 170a could belong to the GPS system while the satellite 170*b* could belong to the Galileo system. While the example network architecture illustrated herein illustrates only two satellites, other implementations may have more or less satellites available, may have satellites associated with one or more GNSS system, and the number of satellites visible to the computer system 120 may depend upon the current geographical location of the computer system 120 and the orbits of the satellites 170. Typically, the computer system 120 will attempt to acquire signals from at least four SVs in order to perform trilateration to determine the location of the computer system 120.

The application content server 160 can be configured to provide one or more applications that can be downloaded to the computer system 120 via the network 110. The application content server 160 can be configured to provide third-party application content that can be downloaded to and executed on the computer system 120. Because the application content provided by the application content server 160 is not controlled by the manufacturer or distributor of the vehicle in which computer system 120 is installed, the applications provided by the application content server 160 may not be suitable for use in a vehicle because the application is a distracting application. A distracting application may provide content or require interactivity that could provide a dangerous distraction to a driver of the vehicle. For example, an application could be a gaming application that can distract the driver of the vehicle by requiring frequent user inputs by touching a touchscreen or other input device of the computer system 120. The application could also be an application that provides video content that could draw the attention of the driver away from the road. Other types of applications, such as chat or texting applications, social media applications, and/or other application that provide a frequent flow of information to and/or from the driver of the vehicle can also be distracting. Such applications, when used in other contexts, such as on a smartphone or tablet of a user that is not operating a vehicle would not present a hazard. The application content server 160 may be provided as a source of third party applications that may be configured operate on a wide variety of computer systems, such as computer system 120, and the application content server 160 may be not be configured to determine the context in which such applications may be used by computer systems that download these applications. While the application content server 160 is represented as a single entity in the example implementation illustrated in FIG. 1, the logical functions performed by the application content server 160 discussed herein can be implemented by more than one network entity. Furthermore, multiple application content servers can be implemented. For example, a first application content server may be implemented for computer systems that utilize a first High Level Operating System (HLOS) and a second application content server may be implemented for computer systems that utilize a second HLOS. In other implementations, there may be more than two application content servers. Furthermore, the functionality of the application content server may be combined with the functionality of the application analysis server 180 discussed below, and the functionality of the application content server 160 and the application analysis server 180 can be implemented by the same set of one or more network entities.

The application analysis server 180 can be configured to provide application-related information to the computer system 120 and/or to analyze applications to determine whether a particular application is a distracting application that may present a hazard if utilized while operating a vehicle. The application analysis server 180 can be configured to maintain one or whitelists of applications that have been determined to be non-distracting applications that can be safely used on computer systems installed in vehicles, such as the computer system 120. The application analysis server 180 can also be configured to maintain one or more blacklists of applications that have been determined to be distracting applications that are unsafe for use on computer system installed in vehicles, such as the computer system 120. The application analysis server 180 can be configured to provide a user interface that allows one or more administrative users to add application to and/or remove applications from the at last one whitelist and/or the at least one blacklist. The whitelist information and/or blacklist information can also be provided by automakers and/or regulators responsible for supervising the automotive industry. The application analysis server 180 can also be configured determine whether an application should be added to a whitelist or blacklist based on an analysis of the application behavior and/or based on application received from one or more computer systems, such as computer system 120. The application analysis server 180 can be implemented by a manufacturer or distributor of the vehicles in which the computer systems, such a computer system 120, may be deployed. The application analysis server 180 can be implemented by a regulator agency responsible for monitoring the automotive industry. Multiple manufacturers may agree implement a single application analysis server or set of servers or different manufacturers or distributors of the vehicles in which the computer systems, such as computer system 120, are included may support separate application analysis servers for supporting computer systems in their vehicles.

The application analysis server 180 can also be configured to maintain one or more application safety rules that can be applied when determining whether an application is a distracting application based on the behavior of the application. The application safety rules can identify various behaviors that, if observed, are indicative that an application is a distracting application. For example, the application safety rules can define a frequency at which the user has touched the touchscreen of the computer system 120 or used another input component of the computer system 120. High frequency of user touches or other inputs can indicate that the application is a gaming application or application that may be too distracting for safe use in the computer system 120 of the vehicle. The application safety rules can also define a threshold of frequency at which dramatic changes in the contents displayed by the application on a display of the computer system 120. A dramatic change to the content being displayed by the computer system 120 can be defined by a threshold percentage of the contents of the screen being changed within a predetermined period of time. The application safety rules can also define a frequency at which information can flow from the user input to the display of the computer system 120. A highly interactive game or other application could distract the driver of the vehicle creating an unsafe situation. The application safety rules can also define a threshold frequency of information flow from a network connection to the display of the computer system 120. High frequency of information flow exceeding the threshold may be indicative of social networking applications, texting applications, online video applications, and other types of applications that can distract the driver of the vehicle. The application safety rules may include utilized by the application analysis server 180 may include one or more of the example rules discussed herein. The application analysis server 180 can also be configured to utilize other rules in addition to or instead of the examples discussed herein. The application analysis server 180 can be configured to provide a user interface that allows one or more administrators to create, modify, and/or remove application safety rules.

The application analysis server 180 can be configured to provide the whitelist, blacklist, and/or application safety rules to a plurality of computer system 120. The application analysis server 180 can be configured push changes out to the computer system 120 as changes are made to the whitelist, blacklist, and/or application safety rules. The application analysis server 180 can be configured push the whitelist, blacklist, and/or application safety rules out to the computer system 120 periodically and can be configured to send only the whitelist, blacklist, and/or application safety rules that have been changed since the last update was pushed out to the computer system 120. The application analysis server 180 can also be configured to receive a request for the whitelist, blacklist, and/or application safety rules or updates to this information from a computer system 120 and to send the requested information to the computer system 120.

While the application analysis server 180 is represented as a single entity in the example implementation illustrated in FIG. 1, the logical functions performed by the application analysis server 180 discussed herein can be implemented by more than one network entity.

The example network configuration illustrated in FIG. 1 is merely an example of one possible configuration of a network in which the techniques disclosed herein may be implemented. Other network configurations may include additional elements not illustrated in FIG. 1 and the various components may be interconnected in a different configuration than what is shown in FIG. 1. Furthermore, as discussed above, the computer system 120 can be implemented such that the computer system 120 includes a wired connection to the network 110 instead of or in addition to the wireless connections illustrated in FIG. 1. Furthermore, the computer system 120 can be configured to remain in a relatively fixed location, such as a set-top box, a server computer system, or desktop computer system that may be moved but typically remains in the same location in contrast to the implementation of the computer system 120 as a mobile device as illustrated in FIG. 1.

Figure 2:
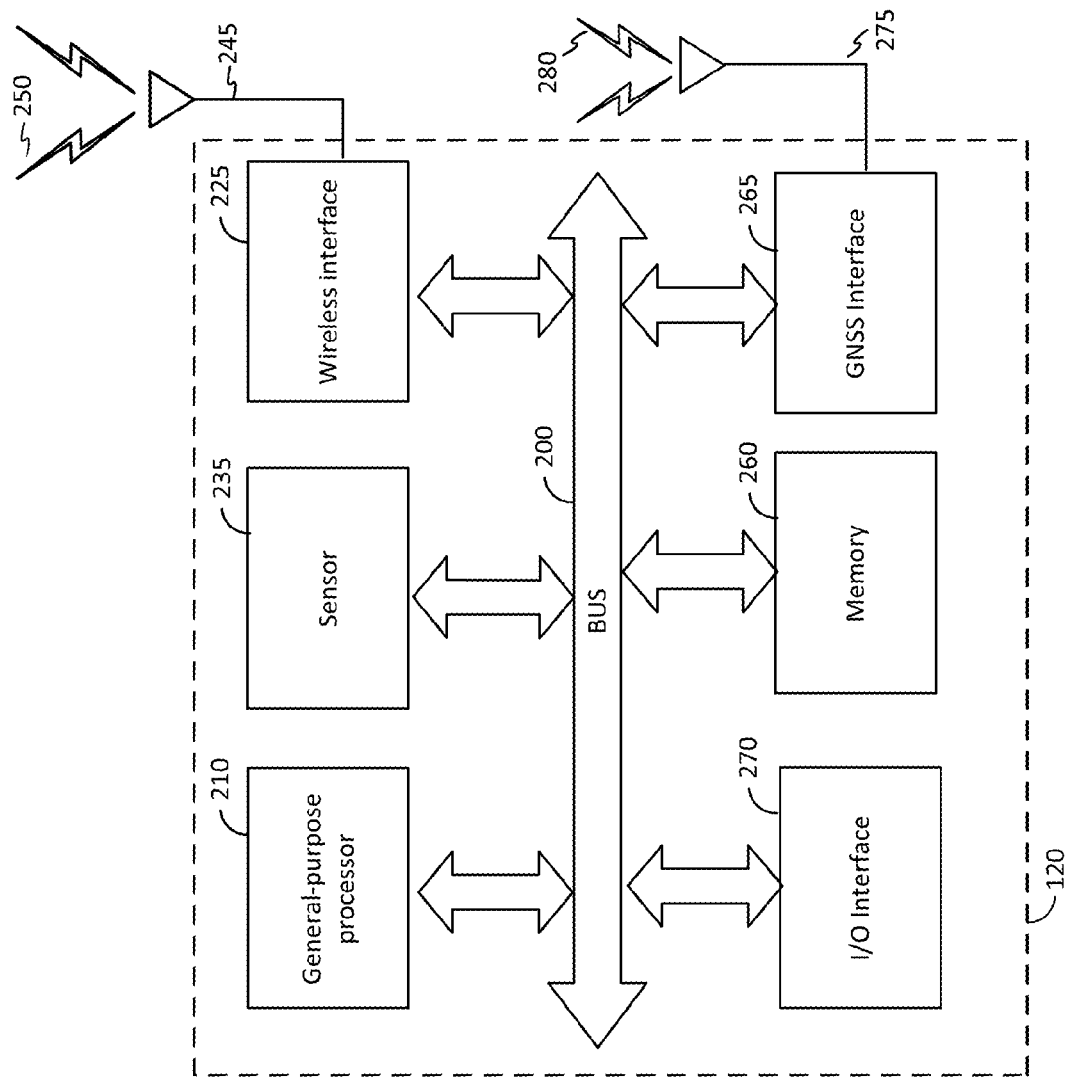
FIG. 2 is a block diagram of an example computer system that can be used to implement the computer system illustrated in FIG. 1.

FIG. 2 is a block diagram of a computer system that can be used to implement the computer system 120 illustrated in FIG. 1. The computer system 120 can be used to implement, at least in part, the processes illustrated in FIGS. 4-11. The computer system 120 can be various types of computer system associated with a vehicle, such as an in vehicle navigation and/or multimedia system that has network connectivity and provides the ability to download and execute applications to the computer system 120 or other type of computer system.

The computer system 120 comprises a processor 210, a wireless interface 225, at least one sensor 235, a GNSS interface 265, an I/O interface 270, and a memory 260, connected to each other by a bus 200. The computer system 120 can include more than one processor. The memory 260 can comprise a non-transitory memory. The processor 210 can be at least one general-purpose processor. Other implementations of the computer system 120 can include additional elements not illustrated in the example implementation of FIG. 2 and/or may not include all of the elements illustrated in the example embodiment illustrated in FIG. 2. For example, some implementations of the computer system 120 may not include the GNSS interface 265.

The wireless interface 225 can include a wireless receiver, transmitter, transceiver, and/or other elements that enable the computer system 120 to send and/or receive data using WWAN, WLAN, and/or other wireless communication protocols. The wireless interface 225 can comprise one or more multi-mode modems capable of transmitting and receiving wireless signals using multiple wireless communications standards. The wireless interface 225 is connected an antenna 245 for sending and receiving communications to/from the wireless transmitters 115 as wireless signals 250, the wireless base station 140, and/or other wireless devices configured to communicate using wireless communication protocols. While the computer system 120 illustrated in FIG. 2 comprises a single wireless interface and a single antenna, other implementations of the computer system 120 can include multiple wireless interfaces and/or multiple antennas.

I/O interface 270 can provide one or more ports and/or other interfaces that can provide for data inputs and/or outputs to the computer system 120. For example, the I/O interface 270 can include one or more ports, such as a Universal Serial Bus (USB) port and/or other type of port that can be used to connect external devices to the computer system 120. The I/O interface 270 can also include one or more input devices, such as buttons, switches, a keypad, a touchscreen and/or other means for receiving input from a user. The I/O interface 270 can also include one or more means for outputting audio and/or visual content, such as a screen, a speaker, a headphone port and/or other means for outputting such content. The I/O interface 270 can also include one or more haptic feedback units that can be used to induce vibrations or motions in the computer system 120. The one or more haptic feedback units can be configured to alert the user to some event and can be configured to provide more than one pattern of haptic feedback.

The at least one sensor 235 can comprise one or more sensors that can be used to collect data that the computer system 120 can use to determine vehicle status information, such as whether the vehicle is moving, the speed of the vehicle, the velocity of the vehicle, and/or other information about the status of the vehicle that the computer system 120 could use when determining whether to limit the execution of a distracting application on the computer system 120. The at least one sensor 235 can comprise one or more accelerometers that can be used to determine the acceleration of the vehicle. The at least one sensor can also include at least one compass that can be used to determine a heading of the vehicle. Other types of sensors can also be included in the computer system 120 that can be used to assess the status of the vehicle. The vehicle status information can be obtained from the Engine Control Unit (ECU) or other electronic components of the vehicle. The vehicle status information can be obtained from the controller area network (CAN) bus of the vehicle as well. The I/O interface 270 discusses above can provide a means for interfacing with the ECU the CAN bus or other components of the vehicle that can provide vehicle status information.

The GNSS interface 265 can include a GNSS receiver and/or other elements that enable the computer system 120 to receive signals from transmitters associated with one or more GNSS systems. The GNSS interface 265 is connected to an antenna 275 for receiving signals 280 from the GNSS transmitters, such as the satellites 170 illustrated in FIG. 1. The computer system 120 can be configured to use signals received from satellites associated with satellites and other transmitters associated with the GNSS systems to determine a position of the computer system 120. The computer system 120 can also be configured to use the signals received from the satellites and other transmitters associated with the GNSS systems in conjunction with signals received from wireless transmitters 115 and/or wireless base stations (such as wireless base station 140) to determine a position of the computer system 120.

The processor 210 can be an intelligent device, e.g., a personal computer central processing unit (CPU), a microcontroller, an application specific integrated circuit (ASIC), etc. The memory 260 is a non-transitory storage device that can include random access memory (RAM), read-only memory (ROM), or a combination thereof. The memory 260 can store processor-readable, processor-executable software code containing instructions for controlling the processor 210 to perform functions described herein (although the description may read that the software performs the function(s)). The software can be loaded onto the memory 260 by being downloaded via a network connection, uploaded from a disk, etc. Further, the software may not be directly executable, e.g., requiring compiling before execution.

The software in the memory 260 is configured to enable the processor 210 to perform various actions, including implementing sending and/or receiving data from the wireless transmitters 115, the wireless base station 140, other mobile devices, and/or other devices configured for wireless communication. The software in the memory 260 can also be configured to enable the processor 210 to perform all or part of one or more of the processes illustrated in FIGS. 4-11. The functional units implemented in the computer system 120 can comprise software components, hardware components (including but not limited to analog and/or digital circuits), or a combination thereof.

Figure 3:
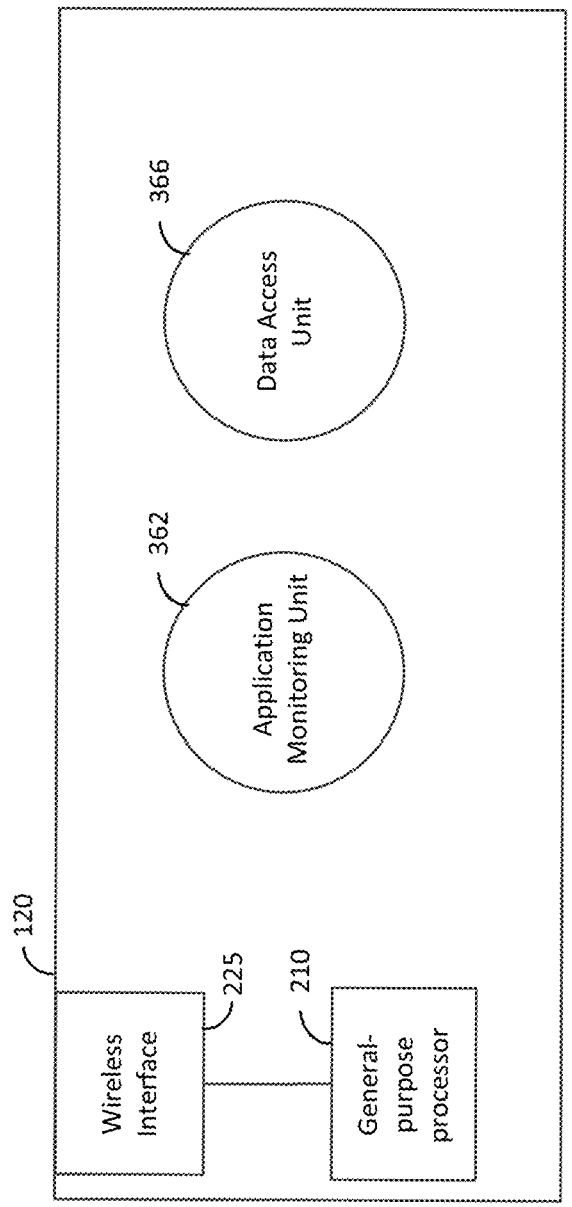
FIG. 3 is a functional block diagram of the computer system illustrated in FIG. 2 that illustrates functional units of the computer system.

FIG. 3 is a functional block diagram of the computer system 120 illustrated in FIG. 2 that illustrates functional units of the memory 260 shown in FIG. 2. For example, the computer system 120 can include an application monitoring unit 362 and a data access unit 366. The computer system 120 may also include one or more additional functional units that provide other functionality to the computer system 120. The functional units illustrated in FIG. 3 can be implemented as software comprising processor-executable instructions stored in memory 260 or another memory of the computer system 120 that can be executed by the processor 210. The functional units illustrated in FIG. 3 can also be implemented as hardware components of the computer system 120, which can be components of the processor 210 or separate components from the processor 210. The functional units illustrated in FIG. 3 can also be implemented as a combination of hardware and software components. The computer system 120 illustrated in FIGS. 2 and 3 can be used to implement the computer system 120 associated with the processes illustrated in FIGS. 4-11.

The application monitoring unit 362 can be configured to provide means for performing the various techniques disclosed herein, including those illustrated in FIGS. 4-11. The application monitoring unit 362 can be configured to monitor the behavior of an application by observing the usage of one or more components of the computer system 120 by the application to generate one or more usage logs for the application, to derive one or more behavior vectors from the application usage logs, to determine whether the application is a distracting application by comparing the one or more behavior vectors to one or more application safety rules, and to limit the execution of the application responsive to determining that the application is a distracting application and based on status information associated with the vehicle. The application monitoring unit 362 can also be configured to prevent the download of application content from the application content server 160, to delete application content stored on the computer system 120, or to prevent the execution of application content responsive to the application being determined to be a distracting application by either the application analysis server 180 or the application monitoring unit 362 or the application being included on a blacklist obtained from the application analysis server 180. The application monitoring unit 362 can also be configured to perform other actions, such as those discussed with respect to FIGS. 4-11. The application monitoring unit 362 can also be configured to perform other actions that are described in the various examples discussed herein. The application monitoring unit 362 can also be configured to obtain vehicle status information from components of the vehicle via the I/O interface 270 or to determine vehicle status information based on information from the at least one sensor 235.

The data access unit 366 can be configured to store data in the memory 260 and/or other data storage devices associated with the computer system 120. The data access unit 366 can also be configured to access data in the memory 260 and/or other data storage devices associated with the computer system 120. The data access unit 366 can be configured to receive requests from other units and/or components of the computer system 120 and to store and/or access data stored in the memory 260 and/or other data storage devices associated with the computer system 120.

Figure 12:
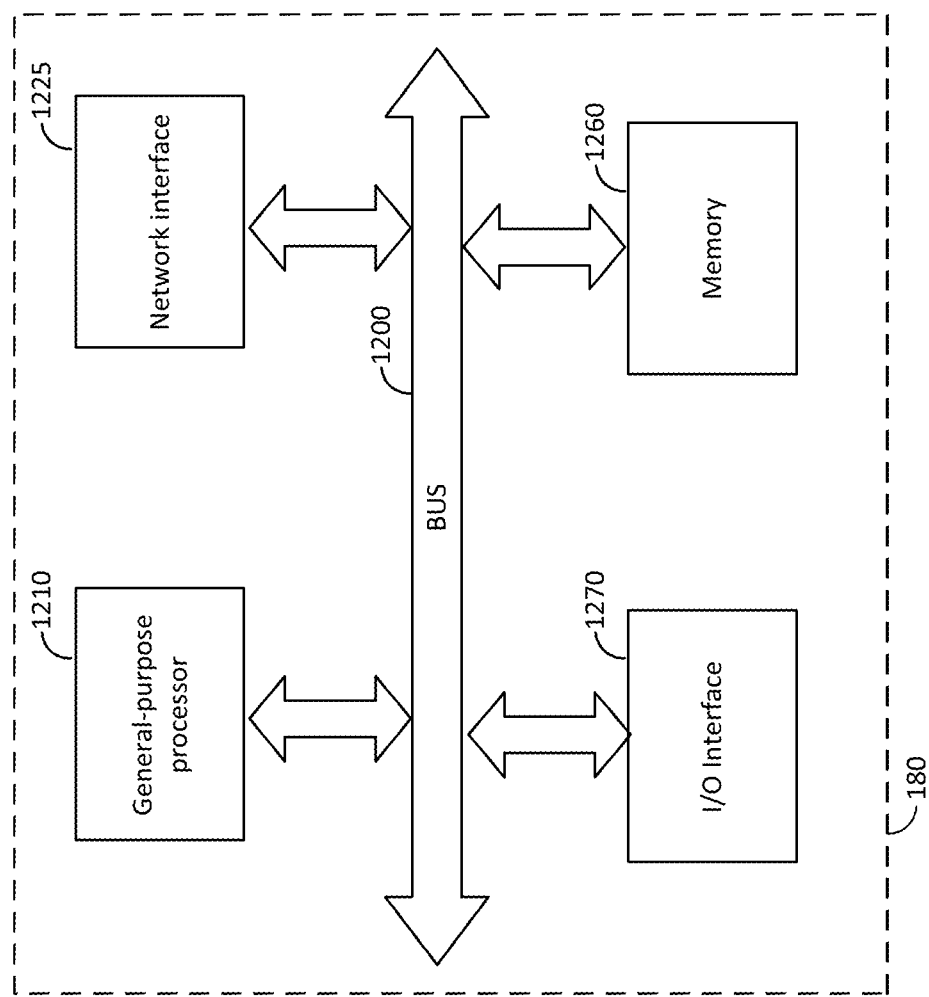
FIG. 12 is a block diagram of an example computer system that can be used to implement the application analysis server illustrated in FIG. 1.

FIG. 12 is a block diagram of an example computer system that can be used to implement the application analysis server illustrated in FIG. 1. The application analysis server 180 can be used to implement, at least in part, the processes illustrated in FIGS. 4-11. The application analysis server 180 can be implemented as one or more network-connected servers. Furthermore, more than one application analysis server can be implemented. For example, different vehicle manufacturers or manufacturers of computer systems, such a computer system 120, for the vehicles may implement an application analysis server 180 for servicing applications for computer systems, such a computer system 120, associated with their vehicles.

The application analysis server 180 comprises computer system including a processor 1210, a network interface 1225, an I/O interface 1270, and a memory 1260, connected to each other by a bus 1200. The application analysis server can also include more than one processor, and the memory 1260 can comprise a non-transitory memory. The processor 1210 can be at least one general-purpose processor. Other implementations of the application analysis server 180 can include additional elements not illustrated in the example implementation of FIG. 12 and/or may not include all of the elements illustrated in the example embodiment illustrated in FIG. 12.

The network interface 1225 can include a wireless receiver, transmitter, transceiver, and/or other elements that enable the application analysis server 180 to send and/or receive data using WWAN, WLAN, and/or other wireless communication protocols. The network interface 1225 can comprise one or more multi-mode modems capable of transmitting and receiving wireless signals using multiple wireless communications standards. The network interface 1225 can be connected an antenna for sending and receiving communications to/from the wireless transmitters 115 as wireless signals, the wireless base station 140, and/or other wireless devices configured to communicate using wireless communication protocols. While the application analysis server 180 illustrated in FIG. 12 comprises a single network interface and a single antenna, other implementations of the application analysis server 180 can include multiple wireless interfaces and/or multiple antennas. The network interface 1225 can also include one or more wired network connections that allow the application analysis server to send and/or receive data using one or more wired communication protocols, such as an Ethernet connection or other types of wired connection.

I/O interface 1270 can provide one or more ports and/or other interfaces that can provide for data inputs and/or outputs to the application analysis server 180. For example, the I/O interface 1270 can include one or more ports, such as a Universal Serial Bus (USB) port and/or other type of port that can be used to connect external devices to the application analysis server 180. The I/O interface 1270 can also include one or more input devices, such as buttons, switches, a keypad, a touchscreen and/or other means for receiving input from a user. The I/O interface 1270 can also include one or more means for outputting audio and/or visual content, such as a screen, a speaker, a headphone port and/or other means for outputting such content.

The processor 1210 can be an intelligent device, e.g., a personal computer central processing unit (CPU), a microcontroller, an application specific integrated circuit (ASIC), etc. The memory 1260 is a non-transitory storage device that can include random access memory (RAM), read-only memory (ROM), or a combination thereof. The memory 1260 can store processor-readable, processor-executable software code containing instructions for controlling the processor 1210 to perform functions described herein (although the description may read that the software performs the function(s)). The software can be loaded onto the memory 1260 by being downloaded via a network connection, uploaded from a disk, etc. Further, the software may not be directly executable, e.g., requiring compiling before execution.

The software in the memory 1260 is configured to enable the processor 1210 to perform various actions, including implementing sending and/or receiving data from one or more computer systems, such a computer system 120, and/or other devices configured for wireless or wired network communication. The software in the memory 1260 can also be configured to enable the processor 1210 to perform all or part of one or more of the processes illustrated in FIGS. 4-11. The functional units implemented in the application analysis server 180 can comprise software components, hardware components (including but not limited to analog and/or digital circuits), or a combination thereof.

Figure 13:
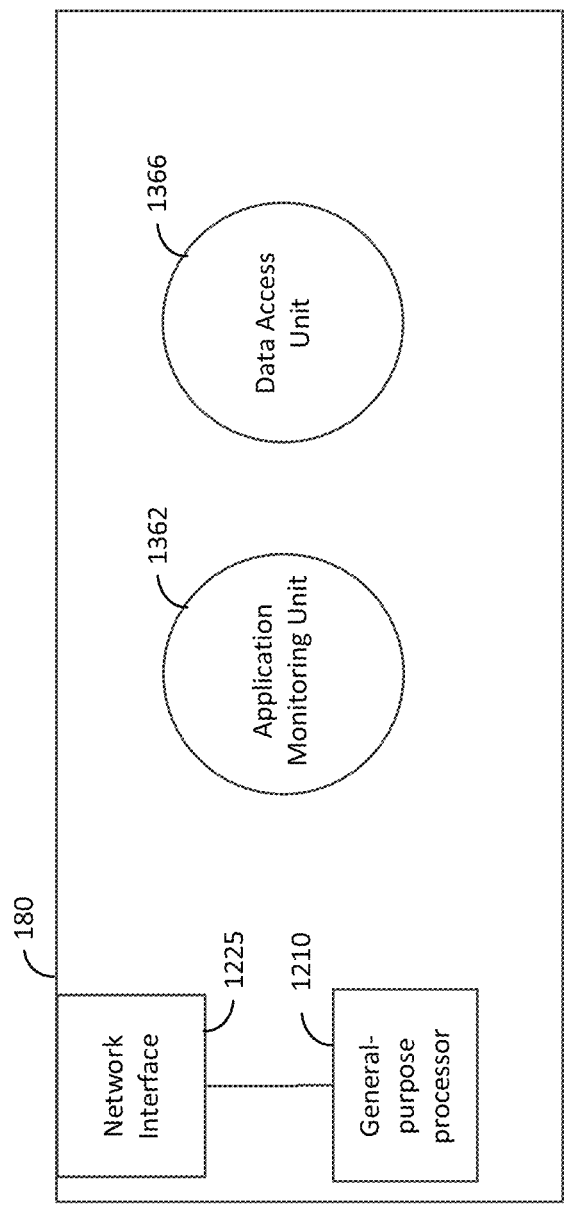
FIG. 13 is a functional block diagram of the application analysis server illustrated in FIG. 2 that illustrates functional units of the server.

FIG. 13 is a functional block diagram of the application analysis server illustrated in FIG. 2 that illustrates functional units of the server. For example, the application analysis server 180 can include an application monitoring unit 1362 and a data access unit 1366. The application analysis server 180 may also include one or more additional functional units that provide other functionality to the application analysis server 180. The functional units illustrated in FIG. 13 can be implemented as software comprising processor-executable instructions stored in memory 1260 or another memory of the application analysis server 180 that can be executed by the processor 1210. The functional units illustrated in FIG. 13 can also be implemented as hardware components of the application analysis server 180, which can be components of the processor 1210 or separate components from the processor 1210. The functional units illustrated in FIG. 13 can also be implemented as a combination of hardware and software components. The application analysis server 180 illustrated in FIGS. 12 and 13 can be used to implement the application analysis server 180 associated with the processes illustrated in FIGS. 4-11.

The application monitoring unit 1362 can be configured to provide means for performing the various techniques disclosed herein, including those illustrated in FIGS. 4-11. The application monitoring unit 1362 can be configured to monitor the behavior of an application by receiving from the computer system 120 application usage information that identifies the usage of one or more components of the computer system 120 by the application to generate one or more usage logs for the application, to derive one or more behavior vectors from the application usage logs, to determine whether the application is a distracting application by comparing the one or more behavior vectors to one or more application safety rules, and to limit the execution of the application responsive to determining that the application is a distracting application and based on status information associated with the vehicle. The application monitoring unit 1362 can also be configured to prevent the download of application content from the application content server 160, to instruct the computer system 120 to delete application content stored on the computer system 120, or to instruct the computer system 120 to prevent the execution of application content responsive to the application being determined to be a distracting application by either the application analysis server 180 or the computer system 120. The application monitoring unit 362 can also be configured to perform other actions, such as those discussed with respect to FIGS. 4-11.

The application monitoring unit 1362 of the application analysis server can be configured to provide a user interface that allows a user to create, modify, and/or remove whitelists, blacklists, and/or application safety rules. The application monitoring unit 1362 can be configured to request that the data access unit 1366 store whitelist information, blacklist information, and/or application safety rule information in the memory 1260 and/or another memory of the application analysis server 180. The application monitoring unit 1362 can also be configured to send whitelist information, blacklist information, and/or application safety rule information to one or more computer systems, such as the computer system 120, via the network interface 1225. The application monitoring unit 1362 can also be configured to receive application usage information, application information, which may include the application itself, and/or other information from one or more computer systems, such as computer system 120. The application monitoring unit 1362 can also be configured to perform other actions that are described in the various examples discussed herein.

The application monitoring unit 1362 can be configured to monitor the behavior of applications on more than one computer system, such as computer system 120, and to derive one or more behavior vectors from the application usage logs, to determine whether the application is a distracting application by comparing determined by the computer systems, such as the computer system 120. Because the application monitoring unit 1362 of the application analysis server 180 can receive application usage data and/or behavior vectors from a large number of computer systems, the application monitoring unit 1362 of the application analysis server 180 can sometimes provide a more accurate assessment of whether a particular application is a distracting application the one or more behavior vectors to one or more application safety rules, and to limit the execution of the application responsive to determining that the application is a distracting application and based on status information associated with the vehicle. The application monitoring unit 362 can make an assessment about an application using a crowdsourced approach where the data is obtained from multiple computer systems. The application monitoring unit 362 can also be configured to receive behavior vector information than an individual computer system, such as computer system 120, may be able to provide due to a limited amount of information that may be available to that individual computer system. The application monitoring unit 1362 can be configured to use the crowdsourced information to update the whitelist information, the blacklist information, application safety rule information, and/or other information about the application.

The data access unit 1366 can be configured to store data in the memory 1260 and/or other data storage devices associated with the application analysis server 180. The data access unit 1366 can also be configured to access data in the memory 1260 and/or other data storage devices associated with the application analysis server 180. The data access unit 1366 can be configured to receive requests from other units and/or components of the application analysis server 180 and to store and/or access data stored in the memory 1260 and/or other data storage devices associated with the application analysis server 180.

FIG. 4 is a flow diagram of an example process for operating a computer system for a vehicle according to the techniques discussed herein. The process illustrated in FIG. 4 can be implemented using the computer system 120, the application analysis server 180, or a combination thereof unless otherwise specified. The application monitoring unit 362 of the computer system 120 and the application monitoring unit 1362 of the computer system 120 can provide means for performing the various stages of the process illustrated in FIG. 4 unless otherwise specified. Each of the stages of the process of FIG. 4 have been discussed below with respect to both the application monitoring unit 362 of the computer system 120 and the application monitoring unit 1362 of the computer system 120.

Usage of at least one component of the computer system by an application can be observed to generate an application usage log for the application (stage 405). Where the process of FIG. 4 is being performed by the computer system 120, the application monitoring unit 362 can be configured to monitor the usage each of one or more components of the computer system 120 of the vehicle while an application is active on the computer system 120. For example, the application monitoring unit 362 can be configured to monitor inputs to the touchscreen of the computer system 120, the amount of data received via the wireless interface 225 for display on the touchscreen of the computer system 120, the amount of content being sent for display on the touchscreen of the computer system 120, how much the content being sent to the display changes over a period of time, the amount of audio and/or video content being displayed on the touchscreen and/or being output as audio content through one or more speakers of the computer system 120 or through one or more speakers of the vehicle, and/or other usage of components of the computer system 120 while the application is active on the computer system 120. The term "active" in this context means that the application is being executed by the computer system 120 and has not been placed in an inactive or background state. The computer system 120 can be configured to execute more than one application simultaneously where one application is currently "active" or being executed as a foreground process while the other applications may be continue to operate as background processes. The computer system 120 can be configured to allow the user to swap between applications that are currently being executed to place an application that is currently active into the background and to bring an application that is being executed in the background to an active state. The application monitoring unit 362 can be configured to write information indicating how the components of the computer system 120 are being executed to one or more application usage logs. The application monitoring unit 362 can be configured to write information associated with each application to a different log or information associated with multiple applications to the same application usage log with information that identifies an application with which an entry in the application usage log is associated. The application monitoring unit 362 can be configured to store the one or more application usage logs in the memory 260 of the computer system 120.

Where the process of FIG. 4 is implemented by the application analysis server 180, the application monitoring unit 1362 of the application analysis server 180 can be configured to receive application usage information from the application monitoring unit 362 of the computer system 120. The application monitoring unit 362 of the computer system 120 can be configured to send the usage information to the application analysis server 180 via a wireless connection to the network 110. The application monitoring unit 362 can also be configured to send the application usage logs generated by the application monitoring unit 362 to the application monitoring unit 1362 of the application analysis server 180. The application monitoring unit 1362 of the application analysis server 180 can be configured to store the application usage information and/or the application usage logs received from the computer system 120 in the memory 1260. The application monitoring unit 1362 can be configured to generate application usage logs for an application based on application usage data received from the computer system 120 in similar fashion as the application monitoring unit 362 generates the application usage logs as discussed above. The application monitoring unit 1362 of the application analysis server 180 can also be configured to generate application usage logs from application usage data received from a plurality of computer systems, such as computer system 120. Obtaining application usage information from a plurality of computer system 120 can provide the application monitoring unit 362 with more information about how an application is computer systems of vehicles and can provide more data that can be used to assess whether a particular application is a distracting application.

A behavior vector can be derived from the application usage log (stage 410). Stage 410 can be performed by the application monitoring unit 362 of the computer system 120 or the application monitoring unit 1362 of the application analysis server 180. The application monitoring unit 362 and/or the application monitoring unit 1362 can be configured to generate one or more behavior vectors for the application based on the one or more application usage logs. The application monitoring unit 362 can be configured to use historical usage data, real-time usage data, and/or a combination thereof to generate the behavior vector. The historical usage data can represent application usage logs that represent usage of components of the computer system 120 by the application in the past. Real-time usage data can represent data that is being collected and added to one or more application usage logs as the application while the application is currently running on the computer system 120. The application monitoring unit 362 can be configured to continually or periodically update the behavior vector or behavior vectors for the application. A behavior vector comprises a set of behavior parameters each associated with an aspect of usage of the components of the computer system 120. The number of behavior parameters and which behavior parameters are included in a particular behavior vector can depend on the implementation of the computer system 120 and/or the application analysis server 180. Deriving the at least one behavior vector for the application includes calculating a value for each of a plurality of behavior parameters associated with usage of components of the computer system 120 associated with the application. The value associated with a particular behavior parameter can indicate how much the application made use of a particular component of the computer system 120. The values associated with the behavior parameters of an application behavior vector can be compared to one or more application safety rules associated with the computer system 120 to make a determination whether the application is a distracting application. An example process for generating such a behavior vector is illustrated in FIG. 7 and is discussed in detail below. The application monitoring unit 362 of the computer system 120 can be configured to generate the one or more application behavior vectors from the one or more application logs stored in the memory 260. The application monitoring unit 1362 of the application analysis server 180 can be configured to generate the one or more application behavior vectors from the one or more application logs stored in the memory 1260 of the application analysis server 180.

Determine whether the application is a distracting application by comparing the at least one behavior vector to one or more application safety rules (stage 415). The application monitoring unit 362 of the computer system 120 can be configured to compare one or more application safety rules to the one or more behavior vectors associated with the application to determine whether the application is a distracting application. An application safety rule can define a threshold value for one or more behavior parameters that, if found in a behavior vector associated with the application, are indicative that the application is a distracting application.

The application monitoring unit 362 can be configured to take into consideration at least one whitelist and/or at least one blacklist, which can be obtained from the application analysis server 180, when determining whether the application is a distracting application. The application monitoring unit 362 can be configured to determine that an application is a distracting application if the application is found on a blacklist even if the comparison of the at least one behavior vector with the at least one application safety rule did not result in a determination that the application was a distracting application. The application may not have exhibited distracting behavior yet but could potentially do since the application was previously added to a blacklist by the application analysis server 180.

The application monitoring unit 362 can be configured to send a message notifying the application analysis server 180 that a discrepancy between a distracting behavior determination and the blacklist information. The message to the application analysis server 180 can include the at least one behavior vector for the application that was determined in stage 410. The application monitoring unit 1362 of the application analysis server 180 can be configured to store the behavior vector information for the application received from one or more computer systems, such a computer system 120, and to reassess whether the application may no long pose a threat and can be removed from the blacklist. The application monitoring unit 1362 of the application analysis server 180 can be configured to alert an administrator to manually reassess the application or can be configured to automatically reassess the application if more than a threshold amount of behavior vector information indicates that the application does not appear to be a distracting application.

The application monitoring unit 362 can be configured to notify the application analysis server 180 if an application on the whitelist has exhibited behavior that indicates that the application is a distracting application. The application monitoring unit 362 can be configured to override the determination that the application is a distracting application if the application is a distracting application and to allow the application to be executed based on the whitelist information. The application monitoring unit 362 can be configured to limit the execution of the application even if the application is included in the whitelist information, and to send a message notifying the application analysis server 180 that a discrepancy between a distracting behavior determination and the whitelist information. The message to the application analysis server 180 can include the at least one behavior vector for the application that was determined in stage 410. The application monitoring unit 1362 of the application analysis server 180 can be configured to store the behavior vector information for the application received from one or more computer systems, such computer system 120, and to reassess whether the application may actually be a distracting application and should be removed from the whitelist. The application monitoring unit 1362 of the application analysis server 180 can be configured to alert an administrator to manually reassess the application or can be configured to automatically reassess the application if more than a threshold amount of behavior vector information indicates that the application appears to be a distracting application.

The application monitoring unit 1362 of the application analysis server 180 can also be configured to determine whether the application is a distracting application using the techniques similar to those discussed above with respect to the application monitoring unit 362 of the computer system 120. The application monitoring unit 1362 can be configured to make a determination whether the application is a distracting application based on one or more behavior vectors for the application that have been derived by the application monitoring unit 1362 of the application analysis server 180 and/or the application monitoring unit 362 of the computer system 120. The application monitoring unit 362 of the computer system 120 can be configured to send application information, including the application itself, one or more behavior vectors, and/or other information to the application monitoring unit 1362 of the application analysis server 180. The application monitoring unit 1362 of the application analysis server 180 can be configured to use behavior vector information from received from multiple computer systems, such as computer system 120, to determine whether the application is a distracting application. The application monitoring unit 1362 can also be configured to use the whitelist and blacklist information discussed above in a similar fashion as the application monitoring unit 362 of the computer system 120 to determine whether the application is a distracting application.

Limiting execution of the application responsive to determining that the application is a distracting application and based on status information associated with the vehicle (stage 420). The application monitoring unit 362 of the computer system 120 can be configured to limit the execution of the application on the computer system 120 responsive to a determination that the application is a distracting application. The application monitoring unit 362 can be configured to take into account vehicle status information associated with the vehicle when determining whether to limit the execution of the application and how to limit the execution of the application. The vehicle status information can be obtained from the Engine Control Unit (ECU) or other electronic components of the vehicle. The vehicle status information can include information such as what gear the vehicle is currently in, the speed at which the vehicle is currently traveling, whether the engine is switched on or off, and/or other information that can be used to assess whether some action should be taken to limit the execution of an application. For example, the application monitoring unit 362 of the computer system 120 or the application monitoring unit 1362 of the application analysis server 180 can make a determination that an application is a distracting application. But, if the vehicle status information indicates that the vehicle is parked, the application monitoring unit 362 of the computer system 120 can be configured to allow the application to operate without any limitations, because the vehicle is not currently being driven and the usage of the application should not distract the driver. The application monitoring unit 362 can also be configured limit the execution of certain applications based on the type of distraction presented and the speed at which the vehicle is moving. For example, applications requiring a high level of user interactivity, such a games or texting applications, could be paused while the vehicle is in moving above a first threshold speed, while other applications that require less user interactivity, such as applications that provide video content may be paused or stopped while the vehicle is moving at a second threshold speed greater that the first threshold speed. The application monitoring unit 362 can also be configured to take into consideration geographic location and/or weather conditions when determining the threshold speed at which an application should be limited. For example, the application monitoring unit 362 can be configured to receive weather information that can indicate that the vehicle is in area experiencing adverse weather conditions, and the application monitoring unit 362 can be configured to pause or stop all applications from being executed while the vehicle is in motion to eliminate any distractions that could cause the driver to lose focus on driving the vehicle during the adverse weather conditions. The application monitoring unit 362 of the computer system 120 can be configured to take into consideration the geographical location of the vehicle, traffic information, and/or map information to determine whether the vehicle is located in a particularly challenging road conditions due to road construction, traffic, windy, narrow, and/or steeply graded road surfaces, and/or other conditions under which the application monitoring unit 362 can pause or stop the execution of application that are determined to be distracting while the vehicle is located in an area in which such conditions are present.

The application monitoring unit 1362 of the application analysis server 180 can be configured to limit the execution of the application on the computer system 120 by sending a message to the application monitoring unit 362 of the computer system 120 to limit the execution of the application. The message can include one or more actions to be performed by the application monitoring unit 362 of the computer system 120 to limit the execution of the application on the computer system 120. The application monitoring unit 362 of the computer system 120 can be configured to provide vehicle status information to the application monitoring unit 1362 of the application analysis server 180 so that the application monitoring unit 1362 of the application analysis server 180 can make a determination as to how to limit the execution of the application. The application monitoring unit 1362 of the application analysis server 180 can also be configured provide instructions in the message to the application monitoring unit 362 of the computer system 120 to perform one or more actions to limit the execution of the application based on vehicle status information as discussed above.

FIG. 5 is a flow diagram of an example process for sending application information to a trusted network entity for an assessment of whether an application is a distracting application according to the techniques discussed herein. The process illustrated in FIG. 5 can be implemented using the computer system 120 unless otherwise specified. The application monitoring unit 362 of the computer system 120 can provide means for performing the various stages of the process illustrated in FIG. 5 unless otherwise specified. The process illustrated in FIG. 5 can be used by the computer system 120 to obtain an assessment of the application from the trusted network entity where the computer system 120 is not configured to make such an assessment. The process illustrated in FIG. 5 can also be used by the computer system 120 to obtain such an assessment from the trusted network entity where the computer system 120 is configured to make such an assessment and the computer system 120 can use the assessment by the trusted network entity in conjunction with the assessment made at the computer system 120. The process illustrated in FIG. 5 can be used to implement stage 415 of the process illustrated in FIG. 4.

Information about the application can be sent from the computer system 120 to a trusted network entity for analysis (stage 505). The application monitoring unit 362 of the computer system 120 can be configured to send application information to a trusted network entity for an assessment whether the application is a distracting application. The trusted network entity can be the application analysis server 180. The application monitoring unit 362 can be configured to send the application information to the application analysis server 180 via the network 110 using the wireless interface 225 of the computer system 120. The application information can include information identifying the application, such as a name of the application, the executable program code of the application, a manufacturer or distributor of the application, and/or other information that can be used to identify the application. The application monitoring unit 362 can also be configured to send any application behavior logs and/or behavior vectors generated by the application monitoring unit 362 with the application information to the computer system 120.

Information can be received from the trusted network entity indicative of whether the application is a distracting application (stage 510). The application analysis server 180 can send a message to the computer system 120, which can be received via the wireless interface 225 of the computer system 120, that indicates whether the application is a distracting application. The application monitoring unit 362 can use the information from the application analysis server 180 to determine whether to application is a distracting application and whether the application monitoring unit 362 should limit the execution of the application on the computer system 120.

FIG. 6 is a flow diagram of an example process for receiving application information from a server according to the techniques discussed herein. The process illustrated in FIG. 6 can be implemented using the computer system 120 unless otherwise specified. The application monitoring unit 362 of the computer system 120 can provide means for performing the various stages of the process illustrated in FIG. 6 unless otherwise specified. The process illustrated in FIG. 6 can be used to implement additional stages of the process illustrated in FIG. 4 or can be used to implement at portion of stage 415 of the process illustrated in FIG. 4.

At least one of whitelist information, blacklist information, or application safety rules information can be received from the trusted network entity (stage 605). The trusted network entity can be the application analysis server 180. The whitelist information can be used to identify applications that have been determined to be non-distracting applications that can be safely used on computer systems installed in vehicles. The blacklist information can be used to identify applications that have been determined to be distracting applications that are unsafe for used on computer systems installed in vehicles. The application safety rules can be applied when determining whether an application is a distracting application based on the behavior of the application. The application analysis server 180 can be configured to push the at least one of whitelist information, blacklist information, or application safety rules information to one or more computer systems, such as computer system 120, in response to the at least one of whitelist information, blacklist information, or application safety rules information being updated. The application analysis server 180 can also be configured to send the at least one of whitelist information, blacklist information, or application safety rules information to a computer system 120 in response to a request from the computer system 120.

The whitelist information, blacklist information, or application safety rule information can be updated based on the information received from the trusted network entity (stage 610). The application monitoring unit 362 of the computer system 120 can be configured to update whitelist information, blacklist information, or application safety rule information stored in the memory 260 or another memory of the computer system 120 in response to receiving the updated information. The application monitoring unit 362 of the computer system 120 can be configured to perform the process illustrated in FIG. 4 to assess whether any applications that are currently active and/or installed on the computer system 120 are distracting applications in response to the receipt of the information from the application analysis server 180.

FIG. 7 is a flow diagram of an example process for deriving behavior vectors from an application usage log according to the techniques discussed herein. The process illustrated in FIG. 7 can be implemented using the computer system 120, the application analysis server 180, or a combination thereof unless otherwise specified. The application monitoring unit 362 of the computer system 120 and the application monitoring unit 1362 of the computer system 120 can provide means for performing the various stages of the process illustrated in FIG. 7 unless otherwise specified. The process illustrated in FIG. 7 can be used to implement stage 410 of the process illustrated in FIG. 4.

At least one application usage log for application can be accessed (stage 705). The application monitoring unit 362 of the computer system 120 can be configured to access the at least one application usage log for the application from the memory 260 or another memory of the computer system 120 using the data access unit 366. The application monitoring unit 1362 of the application analysis server 180 can be configured to access the at least one application usage log for the application from the memory 1260 or another memory of the application analysis server 180 using the data access unit 1366.

Distracting activity related event information from the at least one application log can be identified and categorized by behavior type (stage 710). The application monitoring unit 362 of the computer system 120 or the application monitoring unit 1362 of the application analysis server 180 can be configured to identify distracting activity related information from the behavior logs and to categorize these events by the behavior type. Each behavior type can be associated with usage of one or more components of the computer system 120 by the application.

A total number of identified events associated with each behavior type can be calculated (stage 715). The application monitoring unit 362 of the computer system 120 or the application monitoring unit 1362 of the application analysis server 180 can be configured to add up the total number of behaviors of each type that were identified in the behavior logs.

At least one behavior vector for application can be generated or updated based on total number of identified events for each behavior type (stage 720). As discussed above, a behavior vector includes a set of behavior parameters, and each behavior parameter has an associated value. The application monitoring unit 362 of the computer system 120 or the application monitoring unit 1362 of the application analysis server 180 can be configured to set the value associated with a particular behavior parameter to a value based on the total number of events associated with the behavior type that were identified and categorized from the at least one application log. Alternatively, the application monitoring unit 362 of the computer system 120 or the application monitoring unit 1362 of the application analysis server 180 can be configured to increment the values of an existing behavior vector based on the totals determined in stage 715. In other implementations, the application monitoring unit 362 of the computer system 120 or the application monitoring unit 1362 of the application analysis server 180 can be configured to create a new behavior vector periodically or each time that stage 410 of the process illustrated in FIG. 4 is performed.

The application monitoring unit 362 of the computer system 120 can be configured to access at least one behavior vector for the application from the memory 260 or another memory of the computer system 120 using the data access unit 366 and to update the at least one behavior vector. If no behavior vector is found for the application on the computer system 120, a behavior vector can be created by the application monitoring unit 362 and stored in the memory 260 or another memory of the computer system 120. The application monitoring unit 362 can be configured to send the at least one behavior vector to the application analysis server 180 over the network 110 using the wireless interface 225 of the computer system 120. The application monitoring unit 1362 of the application analysis server 180 can be configured to access the at least one behavior vector for the application from the memory 1260 or another memory of the application analysis server 180 using the data access unit 1366 and to update the at least one behavior vector. If no behavior vector is found for the application on the application analysis server 180, a behavior vector can be created by the application monitoring unit 1362 and stored in the memory 1260 or another memory of the application analysis server 180.

FIG. 8 is a flow diagram of an example process for receiving at a server an update to application-related information and for providing the application-related information to the computer system of a vehicle according to the techniques discussed herein. The process illustrated in FIG. 8 can be implemented using the application analysis server 180 unless otherwise specified. The application monitoring unit 1362 of the computer system 120 can provide means for performing the various stages of the process illustrated in FIG. 8 unless otherwise specified. The process illustrated in FIG. 8 can be used to implement a portion of stage 415 or additional stages of the process illustrated in FIG. 4.

An update to at least one of whitelist information, blacklist information, and application safety rules information can be received at the trusted network entity (stage 805). The trusted network entity can be the application analysis server 180. The application monitoring unit 1362 of the application analysis server 180 can be configured to provide a user interface that allows an administrator to make changes to whitelist information, blacklist information, and/or application safety rule information. The updates can include adding or removing applications from the whitelist and the blacklist. The updates can also include changes to one or more of the application safety rules.

Update at least one of whitelist information, blacklist information, or safety rules information in a data store of the server to the computer system of vehicle (stage 810). The application monitoring unit 1362 of the application analysis server 180 can be configured to access the whitelist information, blacklist information, and/or the application safety rule information from the memory 1260 or another memory of the application analysis server 180 using the data access unit 1366 and to update the information according to the update received in stage 805.

Send at least one of whitelist information, blacklist information, or safety rules information from the server to the computer system of vehicle (stage 815). The application monitoring unit 1362 of the application analysis server 180 can be configure to push the updated information out to one or more computer systems, such as computer system 120, via the network 110 using the network interface 1225 of the application analysis server 180. The application monitoring unit 1362 can be configured to push the updated information out as the update are made to the information or can send out updates periodically to the one or more computer systems, such as computer system 120.

FIG. 9 is a flow diagram of an example process for analyzing application information at a server to determine whether the application is a distracting application according to the techniques discussed herein. The process illustrated in FIG. 9 can be implemented using the application analysis server 180 unless otherwise specified. The application monitoring unit 1362 of the computer system 120 can provide means for performing the various stages of the process illustrated in FIG. 9 unless otherwise specified. The process illustrated in FIG. 9 can be used to implement a portion of stage 415 or additional stages of the process illustrated in FIG. 4.

Application information can be received at the trusted network entity from the computer system of the vehicle (stage 905). The trusted network entity can be the application analysis server 180. The application monitoring unit 362 of the computer system 120 can be configured to send application information to a trusted network entity for an assessment whether the application is a distracting application. The application monitoring unit 1362 of the application analysis server 180 can be configured to receive the application information via the network interface 1225. The application information can include information identifying the application, such as a name of the application, the executable program code of the application, a manufacturer or distributor of the application, and/or other information that can be used to identify the application. The application information can also include any application behavior logs and/or behavior vectors generated by the application monitoring unit 362 of the computer system 120.

The application information can be analyzed to determine whether the application is a distracting application (stage 910). The application monitoring unit 1362 can use techniques similar to those discussed with respect to stage 415 of FIG. 4 to determine whether the application is a distracting application. The techniques executed by the application monitoring unit 1362 can depend on what information was included with the application information. If the application information includes information identifying an application, such as a name of an application, a manufacturer and/or distributer name, and/or one or more application files for the application, the application monitoring unit 1362 can use this information to identify the application and to determine whether the application is found in the blacklist or whitelist information stored at the application analysis server 180. If the application information includes one or more application usage logs, the application analysis server 180 can be configured to derive one or more behavior vectors for the application, using techniques similar to those discussed above with respect to stage 410 of FIG. 4. If the application information includes one or more behavior vectors or the application monitoring unit 1362 was able to derive one or more behavior vectors from application logs for the application, the application monitoring unit can compare the one or more behavior vectors with one or more application safety rules to determine whether the application is a distracting application similar to the technique discussed with respect to stage 415 of the process illustrated in FIG. 4. The application monitoring unit 1362 can be configured to use both blacklist and/or whitelist information and behavior vector information compared with application safety rules as discussed above with respect to FIG. 4. The application monitoring unit 1362 can be configured to use the blacklist and/or whitelist information to make the determination as to whether the application is a distracting application if the blacklist and/or whitelist information contradicts a determination made by the application monitoring unit 1362 using one or more behavior vectors. However, as discussed above, the application monitoring unit 1362 can be configured to update the blacklist and/or whitelist information associated with an application or to alert an administrator of the disparity between observed application behavior and the information on the whitelist and/or blacklist.

The information indicative of whether the application is a distracting application can be sent to the computer system of the vehicle (stage 915). The application monitoring unit 1362 of the application analysis server 180 can send a message to the computer system 120, via the network interface 1225, which indicates whether the application analysis server 180 has determined that the application is a distracting application. The application monitoring unit 362 can use the information from the application analysis server 180 to determine whether to application is a distracting application and whether the application monitoring unit 362 should limit the execution of the application on the computer system 120.

FIG. 10 is a flow diagram of an example process for determining an action to be taken to limit the execution of an application on the computer system according to the techniques discussed herein. The process illustrated in FIG. 11 can be implemented using the computer system 120, the application analysis server 180, or a combination thereof unless otherwise specified. The application monitoring unit 362 of the computer system 120 and the application monitoring unit 1362 of the computer system 120 can provide means for performing the various stages of the process illustrated in FIG. 10 unless otherwise specified. Each of the stages of the process of FIG. 10 have been discussed below with respect to both the application monitoring unit 362 of the computer system 120 and the application monitoring unit 1362 of the computer system 120. The process illustrated in FIG. 10 can be used to implement at least a part of stage 420 of the process illustrated in FIG. 4.

An action to be taken to limit the execution of the application can be determined (stage 1005). The application monitoring unit 362 of the computer system 120 can be configured to determine an action to taken to limit the execution of the application. The application monitoring unit 362 can be configured to terminate the execution or pause the execution of an application that is determined to be a distracting application while the vehicle is in motion. The application monitoring unit 362 can also be configured to uninstall an application that is determined to be particularly distracting. For example, applications that are found on the blacklist or that violate more than a threshold number of safety rules can be removed from the computer system 120 and the application monitoring unit 362 can be configured to prevent these applications from being downloaded again on the device at least until the application is removed from the blacklist. The application monitoring unit 362 can be configured to determine the action to be taken to limit the execution of the application based on the types of safety rules that were violated as determined in stage 415. For example, if an application is determined to be displaying streaming video content, the network access for the application can be cut off while the vehicle is determined to be in motion or the video portion of the content may be prevented from being output to the display of the computer system 120 while an audio portion of the content may be allowed to be continued to be output. If an application is determined to be requiring significant user input, such as a texting application or gaming application, the user input sources including the touchscreen and/or other input devices of the computer system 120 can be locked while the vehicle in motion to prevent the user from interacting with the application. Alternatively, the application can be paused or minimized by the application monitoring unit 362 until the vehicle is once again parked or otherwise in a safe state while still permitting other application content on the computer system 120 to be accessed. The application monitoring unit 362 can be configured to limit the application access to inputs, limit the application output to the screen of the computer system 120, limit the application access to the network, and/or other actions based on the behavior of the application.

The application monitoring unit 1362 of the application analysis server 180 can be configured to determine an action to be taken to limit the execution of the application in a similar fashion as that of the application monitoring unit 1362. The application monitoring unit 1362 can base this decision on a determination that the application is a distracting application that was made by the application monitoring unit 1362 or based on a determination made by the application monitoring unit 362 of the computer system 120.

The action can be performed to limit the execution of the application (stage 1010). The actions determined in stage 1005 can be executed by the application monitoring unit 362 of the computer system 120. The application monitoring unit 1362 of the application analysis server 180 can be configured to send a message to the computer system 120 instructing the application monitoring unit 362 of the computer system 120 to limit the execution of the application in a particular way where stage 1005 was performed by the application analysis server 180.

FIG. 11 is a flow diagram of an example process for determining whether the application is a distracting application by comparing the behavior vectors to one or more application safety rules according to the techniques discussed herein. The process illustrated in FIG. 11 can be implemented using the computer system 120, the application analysis server 180, or a combination thereof unless otherwise specified. The application monitoring unit 362 of the computer system 120 and the application monitoring unit 1362 of the computer system 120 can provide means for performing the various stages of the process illustrated in FIG. 11 unless otherwise specified. Each of the stages of the process of FIG. 11 have been discussed below with respect to both the application monitoring unit 362 of the computer system 120 and the application monitoring unit 1362 of the computer system 120. The process illustrated in FIG. 11 can be used to implement at least a part of stage 415 of the process illustrated in FIG. 4.

At least one behavior vector for the application can be accessed (stage 1105). The application monitoring unit 362 of the computer system 120 can be configured to access the memory 260 and/or another memory of the computer system 120 to obtain the at least one behavior vector. The application monitoring unit 1362 of the application can be configured to access the memory 1260 and/or another memory of the application analysis server 180 to obtain the at least one behavior vector. The at least one behavior vector can be derived from application usage logs as discussed above with respect to stage 410 of the process illustrated in FIG. 4.

At least one application safety rule accessed (stage 1110). The application monitoring unit 362 of the computer system 120 can be configured to access the memory 260 and/or another memory of the computer system 120 to obtain the at least one application safety rule. The application monitoring unit 1362 of the application can be configured to access the memory 1260 and/or another memory of the application analysis server 180 to obtain the at least one behavior vector.

The at least one behavior vector can be compared to the at least one safety rule to determine whether the application is a distracting application (stage 1115). The application monitoring unit 362 of the computer system 120 and/or the application monitoring unit 1362 of the application analysis server 180 can be configured to compare the at least one application safety rule to the at least one behavior vectors associated with the application to determine whether the application is a distracting application. An application safety rule can define a threshold value for one or more behavior parameters that, if found in a behavior vector associated with the application, are indicative that the application is a distracting application. As discussed above, an application behavior vector can include a set of behavior parameters, where each behavior parameter is associated with an aspect of usage of the components of the computer system 120. The number of behavior parameters and which behavior parameters are included in a particular behavior vector can depend on the implementation of the computer system 120 and/or the application analysis server 180. The value associated with a particular behavior parameter can indicate how much the application made use of a particular component of the computer system 120.

A safety rule can comprise set one or more limits on how an application can make use of one or more of the components of the computer system 120 of the vehicle. The safety rule can set a limit on how much usage an application can make of the components of the computer system 120. The application monitoring unit 362 of the computer system 120 and/or the application monitoring unit 1362 of the application analysis server 180 can be configured to make a determination whether the application is a distracting application if the application behavior exceeds any to the thresholds determined by the safety rule. If the application behavior exceeds one or more the threshold values associated with the safety rule, then the application monitoring unit 362 of the computer system 120 and/or the application monitoring unit 1362 of the application analysis server 180 can be configured to determine that the application has violated that safety rule. The application monitoring unit 362 of the computer system 120 and/or the application monitoring unit 1362 of the application analysis server 180 can be configured to compare the at least one behavior vector for the application to more than one safety rule. The application monitoring unit 362 of the computer system 120 and/or the application monitoring unit 1362 of the application analysis server 180 can be configured to can be configured to determine that the application is a distracting application if any safety rule is violated by the application.

Alternatively, the application monitoring unit 362 of the computer system 120 and/or the application monitoring unit 1362 of the application analysis server 180 can be configured to associate an impact value with each application safety rule associated with an estimated severity of how distracting the behavior associated with the application safety rule may be to a driver of the vehicle. The impact value can be determined by the automakers and/or regulators that define the safety rules. The application monitoring unit 362 of the computer system 120 and/or the application monitoring unit 1362 of the application analysis server 180 can be configured to determine that the application is a distracting application if the sum of the impact values of the rules that the behavior of the application violated exceed a predetermined threshold value.

The application monitoring unit 362 of the computer system 120 and/or the application monitoring unit 1362 of the application analysis server 180 can be configured to limit the execution of the application according to the safety rule that was violated and the types of behaviors associated with that safety rule. Stage 420 of the process illustrated in FIG. 4 and the process illustrated in FIG. 10 discuss some examples of the types of actions that the application monitoring unit 362 of the computer system 120 and/or the application monitoring unit 1362 of the application analysis server 180 can be configured to take in response to at least one safety rule being violated by the application.

The methodologies described herein may be implemented by various means depending upon the application. For example, these methodologies may be implemented in hardware, firmware, software, or any combination thereof. For a hardware implementation, the processing units may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, or a combination thereof.

For a firmware and/or software implementation, the methodologies may be implemented with modules (e.g., procedures, functions, and so on) that perform the functions described herein. Any machine-readable medium tangibly embodying instructions may be used in implementing the methodologies described herein. For example, software codes may be stored in a memory and executed by a processor unit. Memory may be implemented within the processor unit or external to the processor unit. As used herein the term "memory" refers to any type of long term, short term, volatile, nonvolatile, or other memory and is not to be limited to any particular type of memory or number of memories, or type of media. Tangible media include one or more physical articles of machine readable media, such as random access memory, magnetic storage, optical storage media, and so on.

If implemented in firmware and/or software, the functions may be stored as one or more instructions or code on a computer-readable medium. Examples include computer-readable media encoded with a data structure and computer-readable media encoded with a computer program. Computer-readable media includes physical computer storage media. A storage medium may be any available medium that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to store desired program code in the form of instructions or data structures and that can be accessed by a computer; disk and disc, as used herein, includes compact disc (CD), laser disc, optical disc, digital versatile disc (DVD), and Blu-ray disc where disks usually reproduce data magnetically, while discs reproduce data optically with lasers. Combinations of the above should also be included within the scope of computer-readable media. Such media also provide examples of non-transitory media, which can be machine readable, and wherein computers are an example of a machine that can read from such non-transitory media.

The generic principles discussed herein may be applied to other implementations without departing from the spirit or scope of the disclosure or claims.

What is claimed is:

1. A method for operating a computer system for a vehicle, the method comprising:
    observing usage of at least one component of the computer system by an application of the computer system to generate an application usage log for the application;
    deriving behavior vectors from the application usage log;
    determining whether the application is a distracting application by comparing the behavior vectors to one or more application safety rules that define a threshold value for one or more behavior parameters, which if exceeded, indicates that the application is a distracting application;
    limiting execution of the application while permitting access to other non-distracting applications on the computer system responsive to determining that the application is a distracting application and based on status information associated with the vehicle comprising information obtained from an engine control unit of the vehicle indicative that a speed of the vehicle exceeds a threshold speed; and
    sending information indicative of the application being a distracting application to a content server responsive to determining that the application is a distracting application, the content server being configured to provide application content downloadable by the computer system.

2. The method of claim 1, wherein deriving the behavior vectors from the application usage log comprises calculating a behavior value for each of a plurality of behavior parameters associated with usage of the computer system.

3. The method of claim 2, wherein the plurality of behavior parameters comprises a frequency at which a user touches a touchscreen of the computer system while interacting with the application.

4. The method of claim 2, wherein the plurality of behavior parameters comprises a frequency at which a display of the computer system changes by more than a threshold amount over a predetermined period of time.

5. The method of claim 2, wherein the plurality of behavior parameters comprises an amount of audio or visual content output over a predetermined period of time.

6. The method of claim 2, wherein the plurality of behavior parameters comprises a frequency at which information is received over a network connection to be presented on a display of the computer system.

7. The method of claim 1, further comprising:
receiving updates to the one or more application safety rules via a wireless connection of the computer system.

8. The method of claim 1, wherein determining whether the application is a distracting application by comparing the behavior vectors to the one or more application safety rules further comprises:
sending information about the application to the content server for analysis, the content server being located remotely from the vehicle, the information about the application comprising the application usage log for the application; and
receiving information from the content server indicative of whether the application is a distracting application.

9. The method of claim 1, wherein limiting the execution of the application comprises limiting functionality of the application based on information indicative of a gear in which the vehicle is in obtained from an engine control unit of the vehicle and a type of distraction presented by the application.

10. The method of claim 1, further comprising:
determining whether the application is identified as being a non-distracting application in information that has been collected from a plurality of computer systems for vehicles by the content server, and wherein sending the information indicative of the application being a distracting application to the content server responsive to determining that the application is a distracting application.

11. A computer system for a vehicle, the computer system comprising:
means for observing usage of at least one component of the computer system by an application of the computer system to generate an application usage log for the application;
means for deriving behavior vectors from the application usage log;
means for determining whether the application is a distracting application by comparing the behavior vectors to one or more application safety rules that define a threshold value for one or more behavior parameters, which if exceeded, indicates that the application is a distracting application;
means for limiting execution of the application while permitting access to other non-distracting applications on the computer system responsive to determining that the application is a distracting application and based on status information associated with the vehicle comprising information obtained from an engine control unit of the vehicle indicative that a speed of the vehicle exceeds a threshold speed; and
means for sending information indicative of the application being a distracting application to a content server responsive to determining that the application is a distracting application, the content server being configured to provide application content downloadable by the computer system.

12. The computer system of claim 11, wherein the means for deriving the behavior vectors from the application usage log comprise means for calculating a behavior value for each of a plurality of behavior parameters associated with usage of the computer system.

13. The computer system of claim 12, wherein the plurality of behavior parameters comprises a frequency at which a user touches a touchscreen of the computer system while interacting with the application.

14. The computer system of claim 12, wherein the plurality of behavior parameters comprises a frequency at which a display of the computer system changes by more than a threshold amount over a predetermined period of time.

15. The computer system of claim 12, wherein the plurality of behavior parameters comprises an amount of audio or visual content output over a predetermined period of time.

16. The computer system of claim 12, wherein the plurality of behavior parameters comprises a frequency wherein the plurality of behavior parameters comprises a frequency at which information is received over a network connection to be presented on a display of the computer system.

17. The computer system of claim 11, further comprising:
receiving updates to the one or more application safety rules via a wireless connection of the computer system.

18. The computer system of claim 11, wherein determining whether the application is a distracting application by comparing the behavior vectors to the one or more application safety rules further comprises:
sending information about the application to the content server for analysis, the content server being located remotely from the vehicle, the information about the application comprising the application usage log for the application; and
receiving information from the content server indicative of whether the application is a distracting application.

19. A computer system for a vehicle, the computer system comprising:
a memory; and
at least one processor coupled to the memory, the at least one processor being configured to:
observe usage of at least one component of the computer system by an application of the computer system to generate an application usage log for the application;
derive behavior vectors from the application usage log;
determine whether the application is a distracting application by comparing the behavior vectors to one or more application safety rules that define a threshold value for one or more behavior parameters, which if exceeded, indicates that the application is a distracting application;
limit execution of the application while permitting access to other non-distracting applications on the computer system responsive to determining that the application is a distracting application and based on status information associated with the vehicle comprising information obtained from an engine control unit of the vehicle indicative that a speed of the vehicle exceeds a threshold speed; and
send information indicative of the application being a distracting application to a content server responsive to determining that the application is a distracting application, the content server being configured to provide application content downloadable by the computer system.

20. The computer system of claim 19, wherein the at least one processor being configured to derive the behavior vectors from the application usage log is configured to calculate a behavior value for each of a plurality of behavior parameters associated with usage of the computer system.

21. The computer system of claim 20, wherein the plurality of behavior parameters comprises at least one of:
a frequency at which a user touches a touchscreen of the computer system while interacting with the application,
a frequency at which a display of the computer system changes by more than a threshold amount over a first predetermined period of time,
a frequency at which the display of the computer system changes by more than a threshold amount over a second predetermined period of time, and
a frequency at which information is presented.

22. The computer system of claim 19, wherein the at least one processor is further configured to:
receive updates to the one or more application safety rules via a wireless connection of the computer system.

23. The computer system of claim 19, wherein the at least one processor being configured to determine whether the application is a distracting application by comparing the behavior vectors to the one or more application safety rules is further configured to:
send information about the application to the content server for analysis, the content server being located remotely from the vehicle, the information about the application comprising the application usage log for the application; and
receive information from the content server indicative of whether the application is a distracting application.

24. A non-transitory, computer-readable medium, having stored thereon computer-readable instructions for operating a computer system of a vehicle, comprising instructions configured to cause the computer system to:
observe usage of at least one component of the computer system by an application of the computer system to generate an application usage log for the application;
derive behavior vectors from the application usage log;
determine whether the application is a distracting application by comparing the behavior vectors to one or more application safety rules that define a threshold value for one or more behavior parameters, which if exceeded, indicates that the application is a distracting application;
limit execution of the application while permitting access to other non-distracting applications on the computer system responsive to determining that the application is a distracting application and based on status information associated with the vehicle comprising information obtained from an engine control unit of the vehicle indicative that a speed of the vehicle exceeds a threshold speed; and
send information indicative of the application being a distracting application to a content server responsive to determining that the application is a distracting application, the content server being configured to provide application content downloadable by the computer system.

25. The non-transitory, computer-readable medium of claim 24, wherein the instructions configured to cause the computer system to derive the behavior vectors from the application usage log comprise instructions configured to cause the computer system to calculate a behavior value for each of a plurality of behavior parameters associated with usage of the computer system.

26. The non-transitory, computer-readable medium of claim 25, wherein the plurality of behavior parameters comprises at least one of:
a frequency at which a user touches a touchscreen of the computer system while interacting with the application,
a frequency at which a display of the computer system changes by more than a threshold amount over a first predetermined period of time,
a frequency at which the display of the computer system changes by more than a threshold amount over a second predetermined period of time, and
a frequency at which information is presented.

27. The non-transitory, computer-readable medium of claim 24, further comprising instructions configured to cause the computer system to:
receive updates to the one or more application safety rules via a wireless connection of the computer system.

28. The non-transitory, computer-readable medium of claim 24, wherein the instructions configured to cause the computer system to determine whether the application is a distracting application by comparing the behavior vectors to the one or more application safety rules further comprise instructions configured to cause the computer system to:
send information about the application to the content server for analysis, the content server being located remotely from the vehicle, the information about the application comprising the application usage log for the application; and
receive information from the content server indicative of whether the application is a distracting application.

* * * * *